US009542738B2

(12) United States Patent
Schultz et al.

(10) Patent No.: US 9,542,738 B2
(45) Date of Patent: Jan. 10, 2017

(54) AUGMENTED THREE DIMENSIONAL POINT COLLECTION OF VERTICAL STRUCTURES

(71) Applicant: Pictometry International Corp., Rochester, NY (US)

(72) Inventors: Stephen L. Schultz, West Henrietta, NY (US); David R. Nilosek, Rochester, NY (US); David S. Petterson, Avon, NY (US); Timothy S. Harrington, Rochester, NY (US)

(73) Assignee: Pictometry International Corp., Rochester, NY (US)

( * ) Notice: Subject to any disclaimer, the term of this patent is extended or adjusted under 35 U.S.C. 154(b) by 0 days.

(21) Appl. No.: 15/060,264

(22) Filed: Mar. 3, 2016

(65) Prior Publication Data

US 2016/0189367 A1    Jun. 30, 2016

Related U.S. Application Data

(62) Division of application No. 14/169,872, filed on Jan. 31, 2014, now Pat. No. 9,292,913.

(51) Int. Cl.
*G06K 9/46* (2006.01)
*G06T 7/00* (2006.01)
(Continued)

(52) U.S. Cl.
CPC ............. *G06T 7/0004* (2013.01); *G01C 11/04* (2013.01); *G01S 17/89* (2013.01);
(Continued)

(58) Field of Classification Search
CPC ................. G01S 17/89; G06K 9/00476; G06T 2207/10044; G06T 2207/30184; G06T 7/0004; G06T 7/0042; G06T 7/606
(Continued)

(56) References Cited

U.S. PATENT DOCUMENTS

| 2,273,876 A | 2/1942 | Lutz et al. |
| 3,153,784 A | 10/1964 | Petrides et al. |

(Continued)

FOREIGN PATENT DOCUMENTS

| AT | 331204 T | 7/2006 |
| BR | 0316110 | 9/2005 |

(Continued)

OTHER PUBLICATIONS

Ackermann, Prospects of Kinematic GPS Aerial Triangulation, ITC Journal, 1992.

(Continued)

*Primary Examiner* — Manuchehr Rahmjoo
(74) *Attorney, Agent, or Firm* — Dunlap Codding, P.C.

(57) ABSTRACT

Automated methods and systems of creating three dimensional LIDAR data are disclosed, including a method comprising capturing images of a geographic area with one or more image capturing devices as well as location and orientation data for each of the images corresponding to the location and orientation of the one or more image capturing devices capturing the images, the images depicting an object of interest; capturing three-dimensional LIDAR data of the geographic area with one or more LIDAR system such that the three-dimensional LIDAR data includes the object of interest; storing the three-dimensional LIDAR data on a non-transitory computer readable medium; analyzing the images with a computer system to determine three dimensional locations of points on the object of interest; and updating the three-dimensional LIDAR data with the three dimensional locations of points on the object of interest determined by analyzing the images.

2 Claims, 17 Drawing Sheets

(51) Int. Cl.
  *G06T 7/60* (2006.01)
  *G01C 11/04* (2006.01)
  *G01S 17/89* (2006.01)
  *G06K 9/00* (2006.01)
  *H04N 5/225* (2006.01)
  *H04N 13/00* (2006.01)

(52) U.S. Cl.
  CPC ....... *G06K 9/00476* (2013.01); *G06K 9/4604* (2013.01); *G06T 7/0042* (2013.01); *G06T 7/0085* (2013.01); *G06T 7/606* (2013.01); *H04N 5/2251* (2013.01); *H04N 13/0003* (2013.01); *G06T 2207/10044* (2013.01); *G06T 2207/30184* (2013.01)

(58) Field of Classification Search
  USPC .......................................................... 382/190
  See application file for complete search history.

(56) References Cited

U.S. PATENT DOCUMENTS

| | | |
|---|---|---|
| 3,594,556 A | 7/1971 | Edwards |
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 * | 6/2004 | Bennett .................. G03B 35/00 348/145 |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,133,551 B2 | 11/2006 | Chen |
| 7,142,984 B2 | 11/2006 | Rahmes et al. |
| 7,184,072 B1 | 2/2007 | Loewen et al. |
| 7,233,691 B2 | 6/2007 | Setterholm |
| 7,262,790 B2 | 8/2007 | Bakewell |
| 7,348,895 B2 | 3/2008 | Lagassey |
| 7,509,241 B2 | 3/2009 | Guo |
| 7,728,833 B2 | 6/2010 | Verma |
| 7,832,267 B2 | 11/2010 | Woro |
| 7,844,499 B2 | 11/2010 | Yahiro |
| 8,078,396 B2 | 12/2011 | Meadow |

(56) References Cited

U.S. PATENT DOCUMENTS

| | | |
|---|---|---|
| 8,705,843 B2 | 4/2014 | Lieckfeldt |
| 2002/0041328 A1 | 4/2002 | LeCompte et al. |
| 2002/0041717 A1 | 4/2002 | Murata et al. |
| 2002/0114536 A1 | 8/2002 | Xiong et al. |
| 2002/0154812 A1 | 10/2002 | Chen et al. |
| 2002/0176635 A1 | 11/2002 | Aligia et al. |
| 2003/0014224 A1 | 1/2003 | Guo et al. |
| 2003/0043824 A1 | 3/2003 | Remboski et al. |
| 2003/0088362 A1 | 5/2003 | Melero et al. |
| 2003/0164962 A1 | 9/2003 | Nims et al. |
| 2003/0214585 A1 | 11/2003 | Bakewell |
| 2004/0105090 A1 | 6/2004 | Schultz et al. |
| 2004/0167709 A1 | 8/2004 | Smitherman et al. |
| 2005/0073241 A1 | 4/2005 | Yamauchi et al. |
| 2005/0088251 A1 | 4/2005 | Matsumoto |
| 2005/0128196 A1 | 6/2005 | Popescu et al. |
| 2005/0169521 A1 | 8/2005 | Hel-Or |
| 2006/0028550 A1 | 2/2006 | Palmer et al. |
| 2006/0092043 A1 | 5/2006 | Lagassey |
| 2006/0238383 A1 | 10/2006 | Kimchi et al. |
| 2006/0250515 A1 | 11/2006 | Koseki et al. |
| 2007/0024612 A1 | 2/2007 | Balfour |
| 2007/0046448 A1 | 3/2007 | Smitherman |
| 2007/0216910 A1* | 9/2007 | Franceschini ........ G01B 11/028 356/498 |
| 2007/0237420 A1 | 10/2007 | Steedly et al. |
| 2008/0120031 A1 | 5/2008 | Rosenfeld et al. |
| 2008/0123994 A1 | 5/2008 | Schultz et al. |
| 2008/0158256 A1 | 7/2008 | Russell et al. |
| 2009/0079730 A1 | 3/2009 | Lee et al. |
| 2009/0177458 A1 | 7/2009 | Hochart et al. |
| 2009/0208095 A1 | 8/2009 | Zebedin |
| 2009/0304227 A1 | 12/2009 | Kennedy et al. |
| 2010/0296693 A1 | 11/2010 | Thornberry et al. |
| 2011/0033110 A1 | 2/2011 | Shimamura et al. |
| 2012/0288158 A1 | 11/2012 | Schultz et al. |
| 2013/0246204 A1 | 9/2013 | Thornberry et al. |
| 2015/0092184 A1 | 4/2015 | Schultz |

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1418402 | 5/2004 |
| EP | 1696204 | 8/2006 |
| ES | 2266704 T | 3/2007 |
| JP | 2003/317089 A | 11/2003 |
| MX | PA05004987 | 2/2006 |
| WO | WO99/18732 | 4/1999 |
| WO | WO/00/53090 | 9/2000 |
| WO | WO/2004/044692 | 5/2004 |
| WO | WO/2005/088251 | 9/2005 |
| WO | WO/2008/028040 | 3/2008 |

OTHER PUBLICATIONS

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava. Jan. 27-30, 2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

Graham, Horita TRG-50 SMPTE Time-Code Reader, Generator, Window Inserter, 1990.

Hess, L.L, et al., "Geocoded Digital Videography for Validation of Land Cover Mapping in the Amazon Basin", International Journal of Remote Sensing, vol. 23, No. 7, pp. 1527-1555, 2002.

Hinthorne, J., et al., "Image Processing in the Grass GIS", Geoscience and Remote Sensing Symposium, 4:2227-2229, 1991.

Imhof, Ralph K., "Mapping from Oblique Photographs", Manual of Photogrammetry, Chapter 18, 1966.

Jensen, John R., Introductory Digital Image Processing: A Remote Sensing Perspective, Prentice-Hall, 1986; 399 pages.

Lapine, Lewis A., "Practical Photogrammetric Control by Kinematic GPS", GPS World, 1(3):44-49, 1990.

Lapine, Lewis A., Airborne Kinematic GPS Positioning for Photogrammetry—The Determination of the Camera Exposure Station, Silver Spring, MD, 11 pages, at least as early as 2000.

Linden et al., Airborne Video Automated Processing, US Forest Service Internal report, Fort Collins, CO, 1993.

Myhre, Dick, "Airborne Video System Users Guide", USDA Forest Service, Forest Pest Management Applications Group, published by Management Assistance Corporation of America, 6 pages, 1992.

Myhre et al., "An Airborne Video System Developed Within Forest Pest Management—Status and Activities", 10 pages, 1992.

Myhre et al., "Airborne Videography—A Potential Tool for Resource Managers"—Proceedings: Resource Technology 90, 2nd International Symposium on Advanced Technology in Natural Resource Management, 5 pages, 1990.

Myhre et al., Aerial Photography for Forest Pest Management, Proceedings of Second Forest Service Remote Sensing Applications Conference, Slidell, Louisiana, 153-162, 1988.

Myhre et al., "Airborne Video Technology", Forest Pest Management/Methods Application Group, Fort Collins, CO, pp. 1-6, at least as early as Jul. 30, 2006.

Norton-Griffiths et al., 1982. "Sample surveys from light aircraft combining visual observations and very large scale color photography". University of Arizona Remote Sensing Newsletter 82-2:1-4.

Norton-Griffiths et al., "Aerial Point Sampling for Land Use Surveys", Journal of Biogeography, 15:149-156, 1988.

Novak, Rectification of Digital Imagery, Photogrammetric Engineering and Remote Sensing, 339-344, 1992.

Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.

Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.

Slaymaker, et al., "Cost-effective Determination of Biomass from Aerial Images", Lecture Notes in Computer Science, 1737:67-76, http://portal.acm.org/citation.cfm?id=648004.743267&coll=GUIDE&dl=,1999.

Slaymaker, et al., "A System for Real-time Generation of Georeferenced Terrain Models", 4232A-08, SPIE Enabling Technologies for Law Enforcement Boston, MA, ftp://vis-ftp.cs.umass.edu/Papers/schultz/spie2000.pdf, 2000.

Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.

Slaymaker, et al., "Calculating Forest Biomass With Small Format Aerial Photography, Videography And A Profiling Laser", In Proceedings of the 17th Biennial Workshop on Color Photography and Videography in Resource Assessment, Reno, NV, 1999.

(56) References Cited

OTHER PUBLICATIONS

Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Star et al., "Geographic Information Systems an Introduction", Prentice-Hall, 1990.
Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", Microimages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
Mostafa, et al., "Ground Accuracy from Directly Georeferenced Imagery", Published in GIM International vol. 14 N. Dec. 12, 2000.
Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.
Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.
Artes F., & Hutton, J., "GPS and Inertial Navigation Delivering", Sep. 2005, GEOconnexion International Magazine, p. 52-53, Sep. 2005.

"POS AV" Applanix, Product Outline, airborne@applanix.com, 3 pages, Mar. 28, 2007.
POSTrack, "Factsheet", Applanix, Ontario, Canada, www.applanix.com, Mar. 2007.
POS AV "Digital Frame Camera Applications", 3001 Inc., Brochure, 2007.
POS AV "Digital Scanner Applications", Earthdata Brochure, Mar. 2007.
POS AV "Film Camera Applications" AeroMap Brochure, Mar. 2007.
POS AV "Lidar Applications" MD Atlantic Brochure, Mar. 2007.
POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.
McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.
"Standards for Digital Orthophotos", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", Bildmessung and Luftbildwesen, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," ISP RS *Journal of Photogrammetry & Remote Sensing*, 56(I): Jun. 1-12, 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. In 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.
AeroDach® Online Roof Evaluation Standard Delivery Format and 3D Data File: Document Version 01.00.2002 with publication in 2002, 13 pages.

(56) References Cited

OTHER PUBLICATIONS

Noronha et al., "Detection and Modeling of Building from Multiple Aerial Images," Institute for Robotics and Intelligent Systems, University of Southern California, Nov. 27, 2001, 32 pages.
Applicad Reports dated Nov. 25, 1999-Mar. 9, 2005, 50 pages.
Applicad Online Product Bulletin archive from Jan. 7, 2003, 4 pages.
Applicad Sorcerer Guide, Version 3, Sep. 8, 1999, 142 pages.
Xactimate Claims Estimating Software archive from Feb. 12, 2010, 8 pages.
Bignone et al, Automatic Extraction of Generic House Roofs from High Resolution Aerial Imagery, Communication Technology Laboratory, Swiss Federal Institute of Technology ETH, CH-8092, Zurich, Switzerland, 12 pages, 1996.
Geospan 2007 Job proposal.
Greening et al., Commercial Applications of GPS-Assisted Photogrammetry, Presented at GIS/LIS Annual Conference and Exposition, Phoenix, AZ, Oct. 1994.
Applanix Corp, Robust, Precise Position and Orientation Solutions, POS/AV & POS/DG Installation & Operation Manual, Redefining the way you survey, May 19, 1999, Ontario, Canada.
Applanix Corp, Robust, Precise Position and Orientation Solutions, POS/AV V4 Ethernet & Disk Logging ICD, Redefining the way you survey, Revision 3, Apr. 18, 2001, Ontario, Canada.
International Search Report and Written Opinion of PCT/US2015/013896, Korean Intellectual Property Office, Mail date May 19, 2015.
Snyder, J., Barr, A., "Ray Tracing Complex Models Containing Surface Tessellations", California Institute of Technology, Pasadena, CA Jul. 1987, pp. 119-128.

* cited by examiner

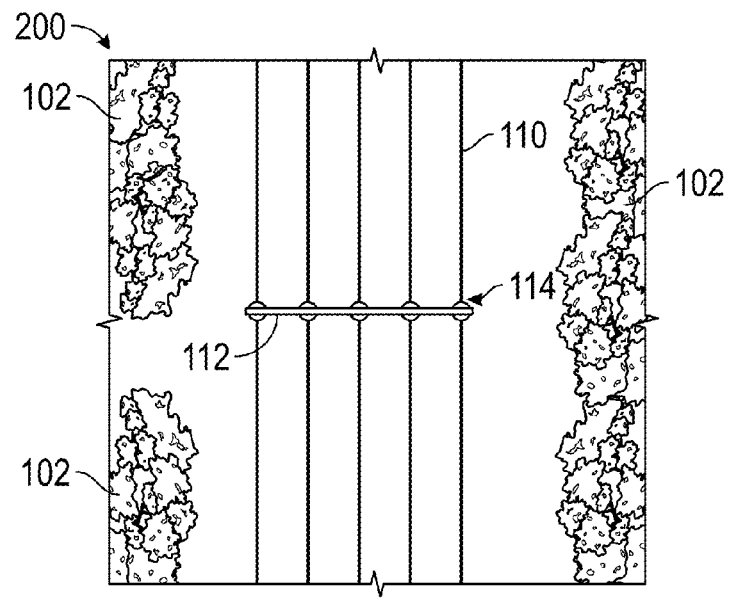
FIG. 12
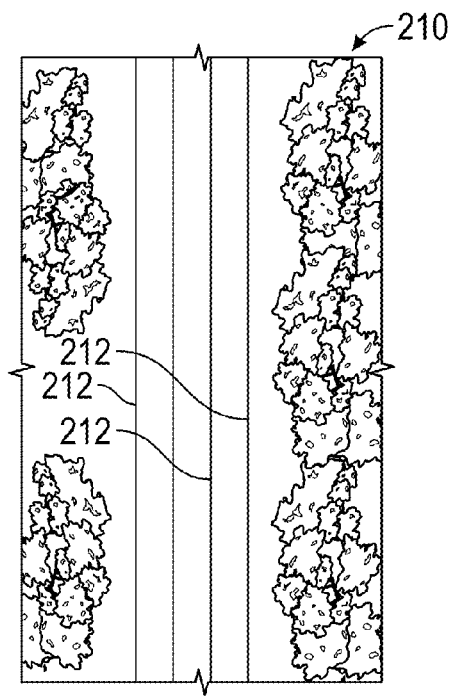 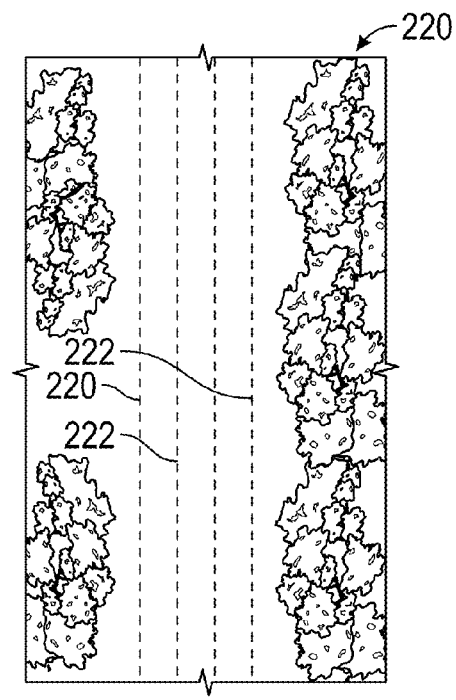
FIG. 13A     FIG. 13B

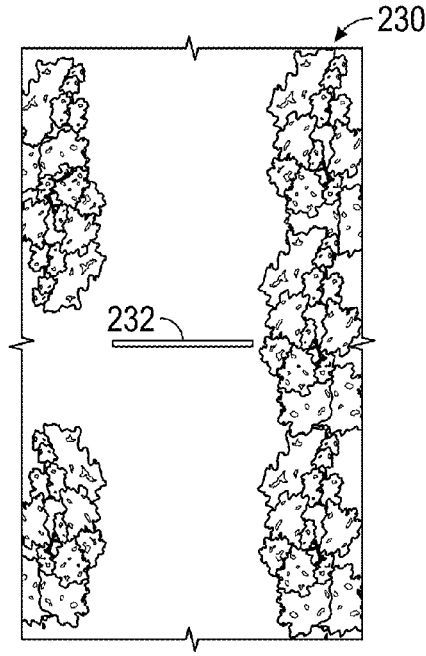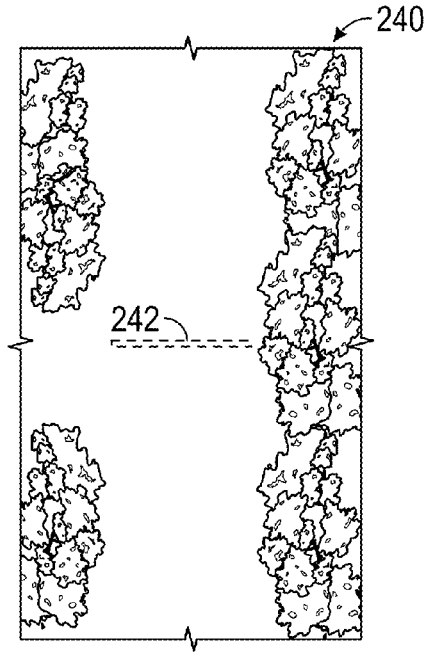
FIG. 14A  FIG. 14B
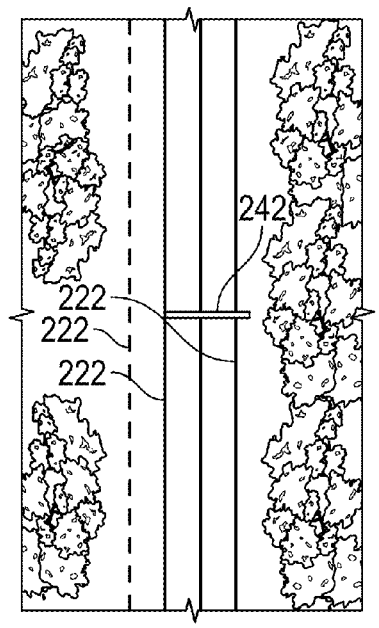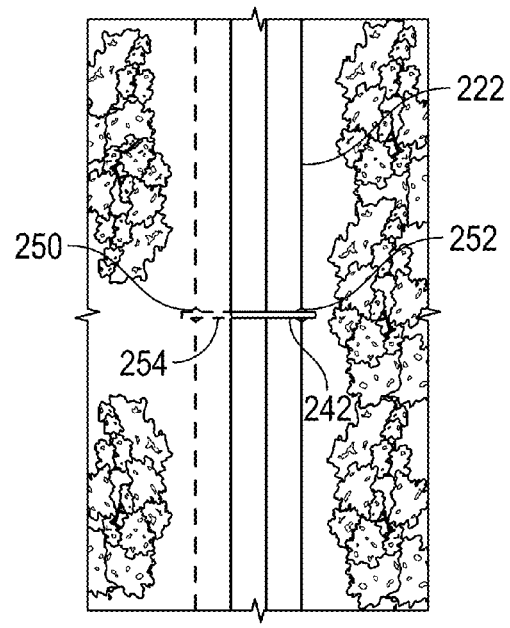
FIG. 15A  FIG. 15B

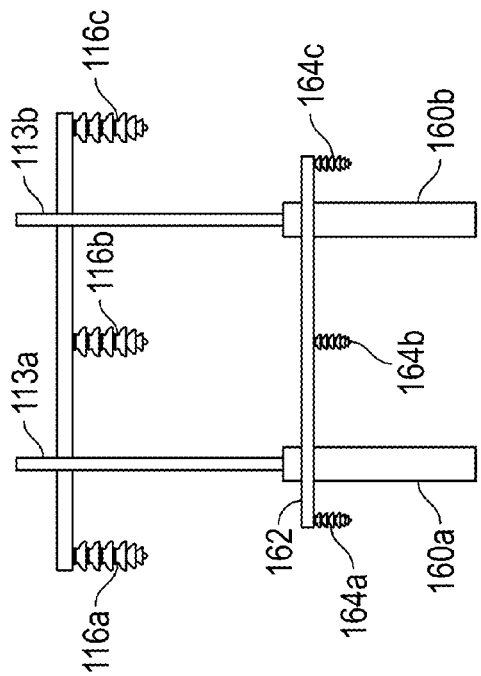
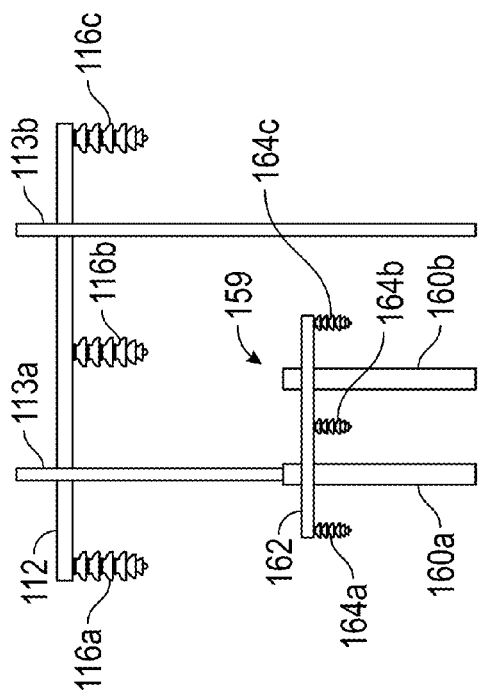
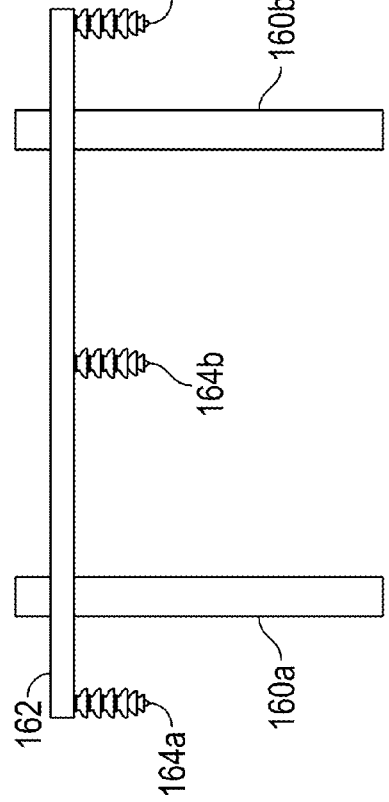
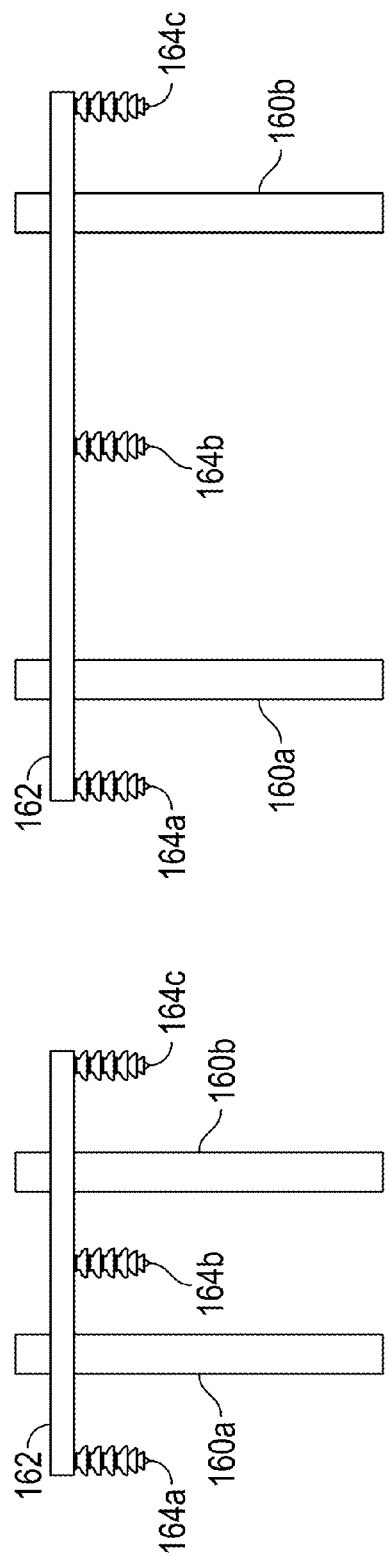
FIG. 18A
FIG. 18B
FIG. 18C
FIG. 18D

AUGMENTED THREE DIMENSIONAL POINT COLLECTION OF VERTICAL STRUCTURES

INCORPORATION BY REFERENCE

The present patent application claims priority to and is a divisional of the patent application identified by U.S. Ser. No. 14/169,872, filed Jan. 31, 2014, all of which the entire contents of which are hereby incorporated herein by reference.

BACKGROUND

The utility industry continually tracks and measures physical assets of its networks (e.g., utility wires, utility poles, utility towers), and assesses the current conditions of those assets. With tracking and measurement, the industry seeks to understand information on the current state of the utilities including infringement rights, growth of vegetation, and the like.

Currently, assessment of the utility corridor includes the use of ground crews that walk or drive along the right of way. Companies may also use anything from helicopter flights carrying experts observing assets from the air, to aerial sensor platforms capturing photographic, positional, or other information through the use of remote sensing technology.

Remote sensing technology may have the ability to be the most cost effective while providing pertinent information for assessment of the utility corridor. Cost efficiency may be increased further with capture efficiency. For example, cost efficiency may be increased by using faster aircraft (e.g., fixed wing aircraft), allowing for collection of data over a large number of utility line miles, and the like. Additionally, the use of multiple sensors may aid in collecting large amounts of sensor data, such as, for example, visible cameras, infra-red cameras, and LIDAR scanners.

One direction that the utility industry is developing is modeling assets and features in three dimensions. One base representation of this structure is known as a Method 1 structure model. Currently, this is produced by collecting three-dimensional data points through the use of a LIDAR scanner. By flying low and slow, helicopter systems capture 10 to 20 points per square meter, producing dense point grids. Even at 40 points per grid, however, the average spacing between each point may be 15-cm or about 6 inches. For smaller structures, this may cause measurement inaccuracy.

While lasers have been achieving higher pulse frequencies, there are physical limitations to collecting higher and denser three-dimensional point clouds from a LIDAR scanner. First, the high density point clouds may require flying lower and slower, running counter to a goal of higher efficiency. Second, in order to achieve the higher pulse repetition rates, multiple pulses may need to be in the air simultaneously. Even though light travels extremely quickly, it may take a set time to reach the ground and reflect back to the sensor of the LIDAR scanner. If too many pulses are in the air simultaneously, subsequent pulses may cause interference.

Traditional LIDAR scanner collection methods typically direct and orient the LIDAR collection system straight down (i.e., nadir). This may only allow for 10 to 20 points per square meter on the ground or on a horizontal structure. When vertical structures are present, however, the point density is even further reduced. For a fully vertical surface, the LIDAR scanner may only collect points prior to the vertical structure and on a horizontal surface of the structure at the vertical top. To produce vertical points, the LIDAR scanner may be tilted at an angle, however, now either multiple LIDAR system may need to be installed to capture multiple sides of the structure, or a conical collection path may need to be collected as described in a patent application identified by U.S. Ser. No. 13/797,172 that was filed on Mar. 12, 2013, which is hereby incorporated by reference in its entirety.

BRIEF DESCRIPTION OF THE SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

FIG. 12 is an exemplary nadir image illustrating utility wires and a cross bar.

FIG. 13A is an exemplary image produced after a Gabor Filter is applied to the utility wires in the nadir image of FIG. 12.

FIG. 13B is an exemplary image produced after a maximum response threshold is applied to the image of FIG. 13A providing detected utility wires.

FIG. 14A is an exemplary image produced after a Gabor Filter is applied to the cross bar in the nadir image of FIG. 12.

FIG. 14B is an exemplary image produced after a maximum response threshold is applied to the image of FIG. 14A providing a detected cross bar.

FIG. 15A is an exemplary image produced after overlapping the images of FIG. 13B and FIG. 14B illustrating detected utility wires and a detected cross bar.

FIG. 15B is an exemplary image of the detected utility wires and detected cross bar of FIG. 15A having an extension applied to the detected cross bar.

FIGS. 18A-18D illustrate an exemplary image displayed on the system of FIG. 2, and the use of an exemplary template for aligning to a utility tower within the image.

DETAILED DESCRIPTION

Figure 1:
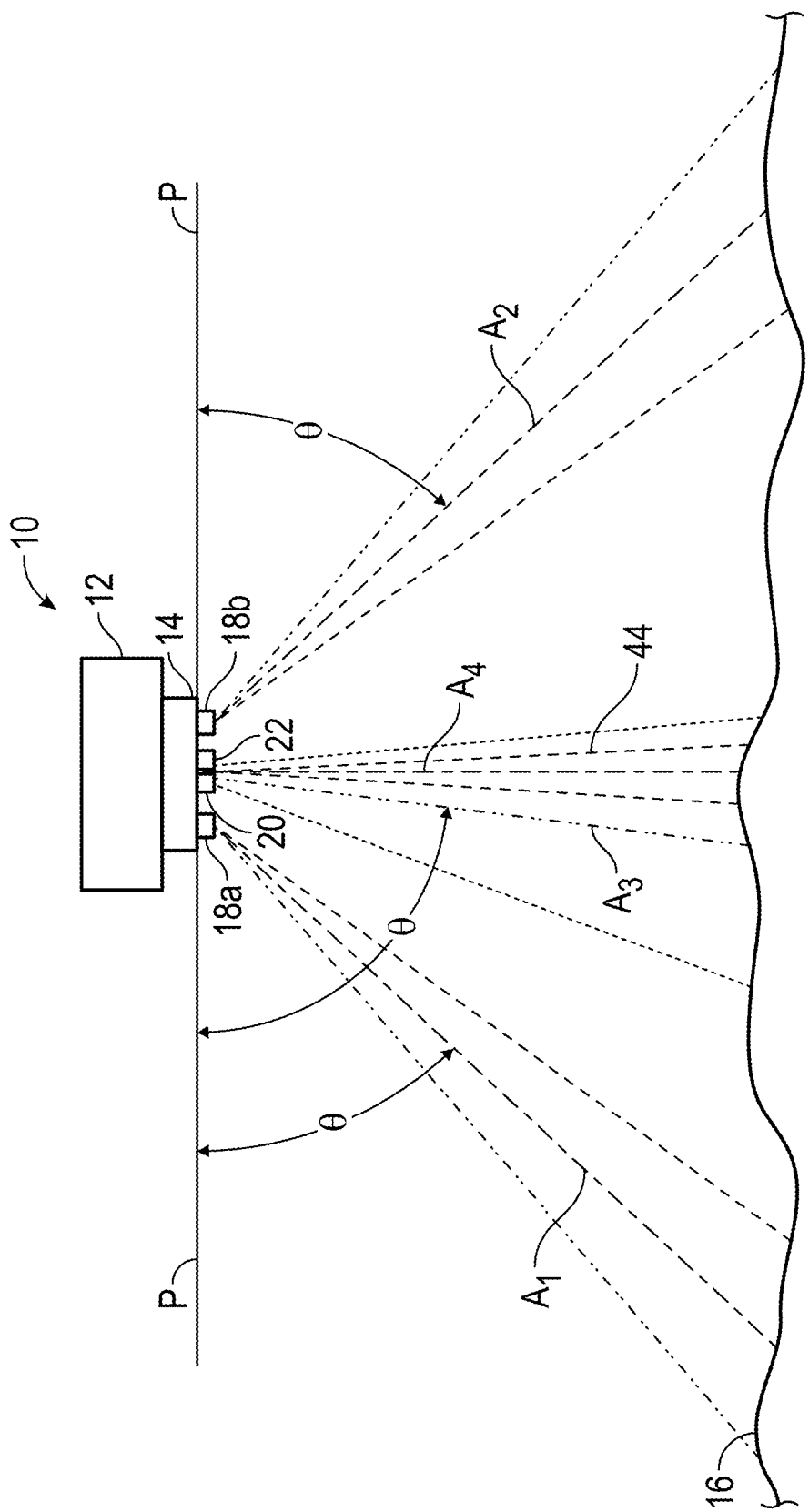
FIG. 1 illustrates an exemplary embodiment of a platform or vehicle carrying an image-capturing system and illustrates exemplary orthogonal and oblique images taken thereby.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

As used in the instant disclosure, the terms "provide", "providing", and variations thereof comprise displaying or providing for display a webpage (e.g., webpage having one or more images and software to permit measurement within the images), electronic communications, e-mail, and/or electronic correspondence to one or more user terminals interfacing with a computer and/or computer network(s) and/or allowing the one or more user terminal(s) to participate, such as by interacting with one or more mechanisms on a webpage, electronic communications, e-mail, and/or electronic correspondence by sending and/or receiving signals (e.g., digital, optical, and/or the like) via a computer network interface (e.g., Ethernet port, TCP/IP port, optical port, cable modem, combinations thereof, and/or the like). A user may be provided with a web page in a web browser, or in a software application, for example.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like.

Software may include one or more computer readable instructions that when executed by one or more components cause the component to perform a specified function. It should be understood that the algorithms described herein may be stored on one or more non-transient memory. Exemplary non-transient memory may include random access memory, read only memory, flash memory, and/or the like. Such non-transient memory may be electrically based, optically based, and/or the like.

It is to be further understood that, as used herein, the term user is not limited to a human being, and may comprise, a computer, a server, a website, a processor, a network interface, a human, a user terminal, a virtual computer, combinations thereof, and the like, for example.

Referring now to the Figures, and in particular to FIG. 1, shown therein is a schematic diagram of hardware forming an exemplary embodiment of an apparatus 10 for three-dimensional point collection of vertical structures. The apparatus 10 may include a platform and/or vehicle 12 carrying an image-capturing and geo-locating system 14.

The platform 12 may be an airplane, space shuttle, rocket, satellite, or any other suitable vehicle capable of carry the image-capturing system 14. For example, in some embodiments, the platform 12 may be a fixed wing aircraft.

The platform 12 may carry the image-capturing system 14 over an area of and at one or more altitudes above a surface 16. For example, the platform 12 may carry the image-capturing system 14 over a predefined area and at one or more predefined altitudes above the Earth's surface and/or any other surface of interest.

The platform 12 may be capable of controlled movement and/or flight. As such, the platform 12 may be manned or unmanned. In some embodiments, the platform 12 may be capable of controlled movement and/or flight along a predefined flight path and/or course. For example, the platform 12 may be capable of controlled movement and/or flight along the Earth's atmosphere and/or outer space. In some embodiments, the platform 12 may be capable of controlled movement and/or flight along a utility corridor.

The platform 12 may include a system for generating and/or regulating power. For example, the platform 12 may include one or more generators, fuel cells, solar panels, and/or batteries for powering the image-capturing and geo-locating system 14.

Figure 2:
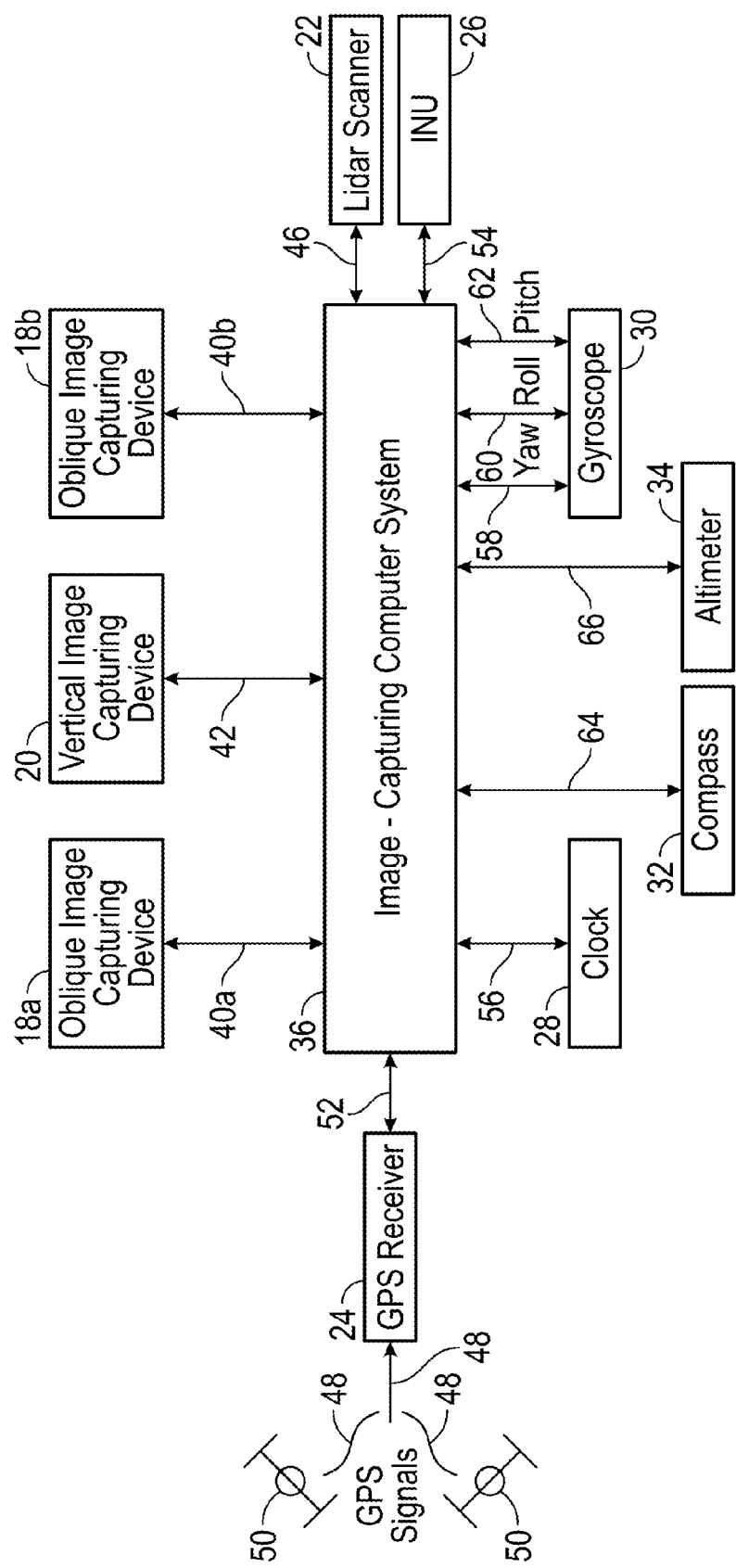
FIG. 2 is a diagrammatic view of the image-capturing system of FIG. 1.

Referring to FIGS. 1 and 2, the image-capturing and geo-locating system 14 may include two or more oblique image capturing devices 18a and 18b, one or more vertical image-capturing devices 20, one or more LIDAR scanners 22, one or more global positioning system (GPS) receivers 24, one or more inertial navigation units (INU) 26, one or more clocks 28, one or more gyroscopes 30, one or more compasses 32, one or more altimeters 34. In some embodiments, each of the elements of the image-capturing and geo-locating system 14 may be interconnected with an image-capturing computer system 36.

Generally, the oblique image-capturing devices 18a and 18b and the vertical image-capturing device 20 may be capable of capturing images photographically and/or electronically. The oblique image-capturing devices 18a and 18b and the vertical image-capturing device 20 may include, but are not limited to, conventional cameras, digital cameras, digital sensors, charge-coupled devices, and/or the like. In some embodiments, the oblique image-capturing devices 18a and 18b and the vertical image-capturing device 20 may be an ultra-high resolution cameras. For example, in some embodiments, the oblique image-capturing devices 18a and 18b may be ultra-high resolution oblique capture systems, such as may be found in the Pictometry PentaView Capture System, manufactured and distributed by Pictometry International based in Henrietta, N.Y. Similarly, in some embodiments, the vertical image-capturing device 20 may also be a high resolution vertical capture system, such as may be found in the Pictometry PentaView Capture System.

The oblique image-capturing devices 18a and 18b and the vertical image-capturing device 20 may include known or determinable characteristics including, but not limited to, focal length, sensor size, aspect ratio, radial and other distortion terms, principal point offset, pixel pitch, alignment, and/or the like.

The oblique image-capturing devices 18a and 18b may include respective central axes $A_1$ and $A_2$. In some embodiments, the oblique image-capturing devices 18a and 18b may be mounted to the platform 12 such that axes $A_1$ and $A_2$ each may be at an angle of declination θ relative to a horizontal plane P as illustrated in FIG. 1. Declination angle θ may be any oblique angle. Generally, declination angle θ may be from approximately 20° (twenty degrees) to approximately 60° (sixty degrees). In some embodiments, the declination angle θ may be approximately 45° (forty-five degrees).

The vertical image-capturing device 20 may include central axis $A_3$. In some embodiments, the vertical image-capturing device 20 may be mounted to the platform 12 such that the angle of declination θ relative to a horizontal plane P of axis $A_3$ is approximately 90° (ninety degrees). As such, the vertical image-capturing device 20 may generally be mounted at nadir.

The oblique image-capturing devices 18a and 18b may acquire one or more oblique images and issue one or more image data signals (IDS) 40a and 40b corresponding to one or more particular oblique images or oblique photographs taken. The vertical image-capturing device 20 may acquire one or more nadir images and issue one or more image data signals (IDS) 42 corresponding to one or more particular nadir images or nadir photographs taken. Oblique images and/or nadir images may be stored in the image-capturing computer system 36.

The LIDAR scanner 22 may determine a distance between the platform 12 and an object of interest by illuminating the object of interest with a laser and analyzing the reflected light. An exemplary LIDAR scanner 22 may be the Riegl LMS-Q680i, manufactured and distributed by Riegl Laser Measurement Systems located in Horn, Austria. In some embodiments, the LIDAR scanner 22 may be a downward projecting high pulse rate LIDAR scanning system.

In some embodiments, the LIDAR scanner 22 may be mounted in an off-vertical position on the platform 12. For example, the LIDAR scanner 22 may be mounted to the platform 12 such that axis $A_4$ may be at an angle of declination θ relative to a horizontal plane P. Declination angle θ may be any oblique angle. In some embodiments, the declination angle θ may be any angle less than or equal to 80 degrees such that the axis $A_4$ is roughly 10 degrees or more up from nadir in either a forward or rearward direction. Mounting in an off-vertical position (i.e., non-nadir) may aid in obtaining points on a face of a vertical structure as described in further detail herein. In some embodiments, the LIDAR scanner 22 may collect on average between 5 and 10 points per square meter.

Alternatively, a helical scan LIDAR system may be used in lieu of, or in addition to, the LIDAR scanner 22. The helical scan LIDAR system may be mounted such that at least one portion of the scan pattern may be roughly 10 degrees or more up from nadir.

The GPS receiver 24 may receive global positioning system (GPS) signals 48 that may be transmitted by one or more global positioning system satellites 50. The GPS signals 48 may enable the location of the platform 12 relative to the surface 16 and/or an object of interest to be determined. The GPS receiver 24 may decode the GPS signals 48 and/or issue location signals and/or data 52. The location signals and/or data 52 may be dependent, at least in part, on the GPS signals 48 and may be indicative of the location of the platform 12 relative to the surface 16 and/or an object of interest. The location signals and/or data 52 corresponding to each image captured by the oblique image-capturing devices 18a and 18b and/or the vertical image-capturing device 20 may be received and/or stored by the image-capturing computer system 36 in a manner in which the location signals are associated with the corresponding image.

The INU 26 may be a conventional inertial navigation unit. The INU 26 may be coupled to and detect changes in the velocity (e.g., translational velocity, rotational velocity) of the oblique image capturing devices 18a and 18b, the vertical image-capturing devices 20, the LIDAR scanner 22, and/or the platform 12. The INU 26 may issue velocity signals and/or data 54 indicative of such velocities and/or changes therein to image-capturing computer system 36. The image-capturing computer system 36 may then store the velocity signals and/or data 54 corresponding to each oblique and/or nadir image captured by the oblique image-capturing devices 18a and 18b, the vertical image-capturing device 20, and/or points collected by the LIDAR scanner 22.

The clock 28 may keep a precise time measurement. For example, the clock 28 may keep a precise time measurement used to synchronize events within the image capturing and geo-locating system 14. The clock 28 may include a time data/clock signal 56. In some embodiments, the time data/clock signal 56 may include a precise time that an oblique and/or nadir image is taken by the oblique image-capturing devices 18a and 18b and/or the vertical image-capturing device 20, and/or the precise time that points are collected by the LIDAR scanner 22. The time data 56 may be received by and/or stored by the image-capturing computer system 36. In some embodiments, the clock 28 may be integral with the image-capturing computer system 36, such as, for example, a clock software program.

The gyroscope 30 may be a conventional gyroscope commonly found on airplanes and/or within navigation systems (e.g., commercial navigation systems for airplanes). Gyroscope 30 may submit signals including a yaw signal 58, a roll signal 60, and/or a pitch signal 62. In some embodiments, the yaw signal 58, the roll signal 60, and/or the pitch signal 62 may be indicative of the yaw, roll and pitch of the platform 12. The yaw signal 58, the roll signal 60, and/or the pitch signal 62 may be received and/or stored by the image-capturing computer system 36.

The compass 32 may be any conventional compass (e.g., conventional electronic compass) capable of indicating the heading of the platform 12. The compass 32 may issue a heading signal and/or data 64. The heading signal and/or data 64 may be indicative of the heading of the platform 12. The image-capturing computer system 36 may receive, store and/or provide the heading signal and/or data 64 corresponding to each oblique and/or nadir image captured by the oblique image-capturing devices 18a and 18b and/or the vertical image-capturing device 20.

The altimeter 34 may indicate the altitude of the platform 12. The altimeter 34 may issue an altimeter signal and/or data 66. The image-capturing computer system 36 may receive, store and/or provide the altimeter signal and/or data 66 corresponding to each oblique and/or nadir image captured by the oblique image-capturing devices 18a and 18b, and/or the vertical image-capturing device 20.

Figure 3:
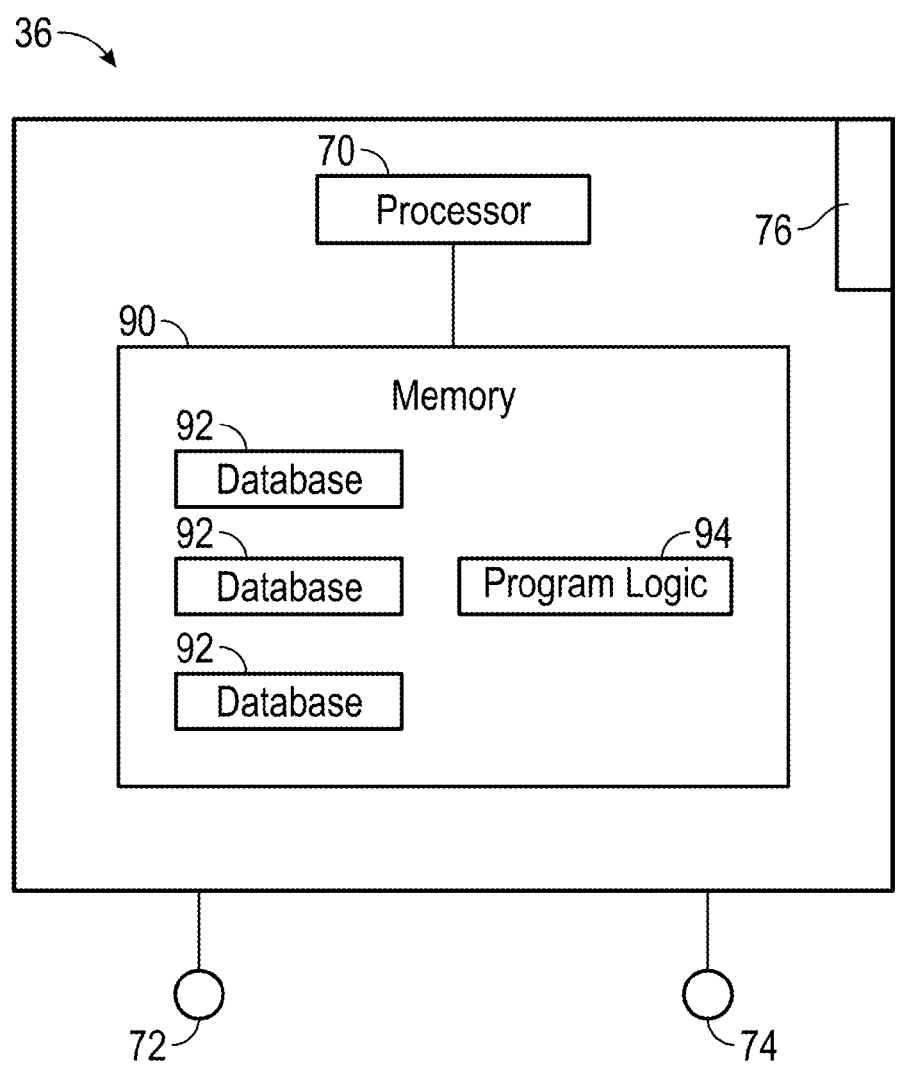
FIG. 3 is a block diagram of the image-capturing computer system of FIG. 2.

Referring to FIGS. 2 and 3, the image-capturing computer system 36 may be a system or systems that are able to embody and/or execute the logic of the processes described herein. Logic embodied in the form of software instructions and/or firmware may be executed on any appropriate hardware. For example, logic embodied in the form of software instructions or firmware may be executed on a dedicated system or systems, or on a personal computer system, or on a distributed processing computer system, and/or the like. In some embodiments, logic may be implemented in a stand-alone environment operating on a single computer system and/or logic may be implemented in a networked environment, such as a distributed system using multiple computers and/or processors.

In some embodiments, the image-capturing computer system 36 may include one or more processors 70 communicating with one or more image capturing input devices 72, image capturing output devices 74, and/or I/O ports 76 enabling the input and/or output of data to and from the image-capturing computer system 36.

FIG. 3 illustrates the image-capturing computer system 36 having a single processor 70. It should be noted, however, that the image-capturing computer system 36 may include multiple processors 70. In some embodiments, the processor 70 may be partially or completely network-based or cloud-based. The processor 70 may or may not be located in a single physical location. Additionally, multiple processors 70 may or may not necessarily be located in a single physical location.

The one or more image capturing input devices 72 may be capable of receiving information input from a user and/or processor(s), and transmitting such information to the processor 70. The one or more image capturing input devices 72 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, speech recognition, gesture recognition, eye tracking, brain-computer interface, combinations thereof, and/or the like.

The one or more image capturing output devices 74 may be capable of outputting information in a form perceivable by a user and/or processor(s). For example, the one or more image capturing output devices 74 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more image capturing input devices 72 and the one or more image capturing output devices 74 may be implemented as a single device, such as, for example, a touchscreen or a tablet.

Each of the data signals 40a, 40b, 42, 46, 52, 54, 56, 58, 60, 62, and/or 64 may be provided to the image capturing computer system 36. For example, each of the data signals 40a, 40b, 42, 46, 52, 54, 56, 58, 60, 62, and/or 64 may be received by the image capturing computer system 36 via the I/O port 76. The I/O port may comprise one or more physical and/or virtual ports.

Figure 4:
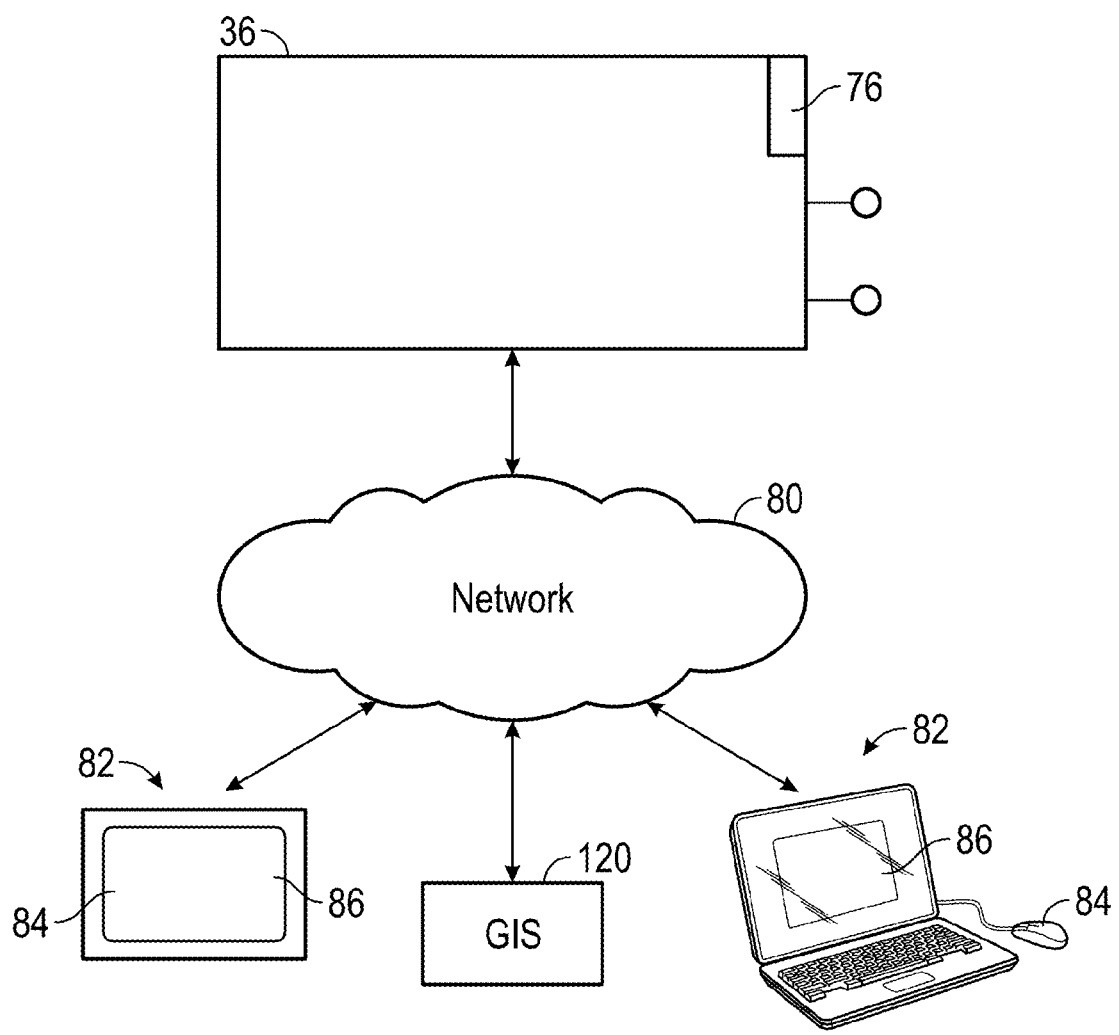
FIG. 4 is a block diagram of the image-capturing computer system of FIG. 2 communicating via a network with multiple processors and a geographical information system (GIS) data system.

In some embodiments, the image-capturing computer system 36 may be in communication with one or more additional processors 82 as illustrated in FIG. 4. In this example, the image-capturing computer system 36 may communicate with the one or more additional processors 82 via a network 80. As used herein, the terms "network-based", "cloud-based", and any variations thereof, may include the provision of configurable computational resources on demand via interfacing with a computer and/or computer network, with software and/or data at least partially located on the computer and/or computer network, by pooling processing power of two or more networked processors.

In some embodiments, the network 80 may be the Internet and/or other network. For example, if the network 80 is the Internet, a primary user interface of the image capturing software and/or image manipulation software may be delivered through a series of web pages. It should be noted that the primary user interface of the image capturing software and/or image manipulation software may be replaced by another type of interface, such as, for example, a Windows-based application.

The network 80 may be almost any type of network. For example, the network 80 may interface by optical and/or electronic interfaces, and/or may use a plurality of network topographies and/or protocols including, but not limited to, Ethernet, TCP/IP, circuit switched paths, and/or combinations thereof. For example, in some embodiments, the network 80 may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a satellite network, a radio network, an optical network, a cable network, a public switched telephone network, an Ethernet network, combinations thereof, and/or the like. Additionally, the network 80 may use a variety of network protocols to permit bi-directional interface and/or communication of data and/or information. It is conceivable that in the near future, embodiments of the present disclosure may use more advanced networking topologies.

The image capturing computer system 36 may be capable of interfacing and/or communicating with the one or more computer systems including processors 82 via the network 80. Additionally, the one or more processors 82 may be capable of communicating with each other via the network 80. For example, the image capturing computer system 36 may be capable of interfacing by exchanging signals (e.g., analog, digital, optical, and/or the like) via one or more ports (e.g., physical ports or virtual ports) using a network protocol, for example.

The processors 82 may include, but are not limited to implementation as a a variety of different types of computer systems, such as a server system having multiple servers in a configuration suitable to provide a commercial computer based business system (such as a commercial web-site), a personal computer, a smart phone, a network-capable television set, a television set-top box, a tablet, an e-book reader, a laptop computer, a desktop computer, a network-capable handheld device, a video game console, a server, a digital video recorder, a DVD player, a Blu-Ray player, a wearable computer, a ubiquitous computer, combinations thereof, and/or the like. In some embodiments, the computer systems comprising the processors 82 may include one or more input devices 84, one or more output devices 86, processor executable code, and/or a web browser capable of accessing a website and/or communicating information and/or data over a network, such as network 80. The computer systems comprising the one or more processors 82 may include one or more non-transient memory comprising processor executable code and/or software applications, for example. The image capturing computer system 36 may be modified to communicate with any of these processors 82 and/or future developed devices capable of communicating with the image capturing computer system 36 via the network 80.

The one or more input devices 84 may be capable of receiving information input from a user, processors, and/or environment, and transmit such information to the processor 82 and/or the network 80. The one or more input devices 84 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, speech recognition, gesture recognition, eye tracking, brain-computer interface, combinations thereof, and/or the like.

The one or more output devices 86 may be capable of outputting information in a form perceivable by a user and/or processor(s). For example, the one or more output devices 86 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more input devices 84 and the one or more output devices 86 may be implemented as a single device, such as, for example, a touchscreen or a tablet.

Referring to FIGS. 2 and 3, in some embodiments, the image-capturing computer system 36 may include one or more processors 70 working together, or independently to execute processor executable code, and one or more memories 90 capable of storing processor executable code. In some embodiments, each element of the image-capturing computer system 36 may be partially or completely network-based or cloud-based, and may or may not be located in a single physical location.

The one or more processors 70 may be implemented as a single or plurality of processors working together, or independently, to execute the logic as described herein. Exemplary embodiments of the one or more processors 70 may include, but are not limited to, a digital signal processor (DSP), a central processing unit (CPU), a field programmable gate array (FPGA), a microprocessor, a multi-core processor, and/or combination thereof, for example. The one or more processors 70 may be capable of communicating via the network 80, illustrated in FIG. 4, by exchanging signals (e.g., analog, digital, optical, and/or the like) via one or more ports (e.g., physical or virtual ports) using a network protocol. It is to be understood, that in certain embodiments, using more than one processor 70, the processors 70 may be located remotely from one another, in the same location, or comprising a unitary multi-core processor. The one or more processors 70 may be capable of reading and/or executing processor executable code and/or capable of creating, manipulating, retrieving, altering, and/or storing data structures into one or more memories 90.

The one or more memories 90 may be capable of storing processor executable code. Additionally, the one or more memories 90 may be implemented as a conventional non-transient memory, such as, for example, random access memory (RAM), a CD-ROM, a hard drive, a solid state drive, a flash drive, a memory card, a DVD-ROM, a floppy disk, an optical drive, combinations thereof, and/or the like, for example.

In some embodiments, the one or more memories 90 may be located in the same physical location as the image capturing computer system 36. Alternatively, one or more memories 90 may be located in a different physical location as the image capturing computer system 36, the with image capturing computer system 36 communicating with one or more memories 90 via a network such as the network 80, for example. Additionally, one or more of the memories 90 may be implemented as a "cloud memory" (i.e., one or more memories 90 may be partially or completely based on or accessed using a network, such as network 80, for example).

Referring to FIGS. 2 and 3, the one or more memories 90 may store processor executable code and/or information comprising one or more databases 92 and program logic 94. In some embodiments, the processor executable code may be stored as a data structure, such as a database and/or data table, for example.

In use, the image-capturing computer system 36 may execute the program logic 94 which may control the reading, manipulation, and/or storing of data signals 40a, 40b, 42, 46, 52, 54, 56, 58, 60, 62, and/or 64. For example, the program logic may read data signals 40a, 40b, and/or 42, and may store them within the one or more memories 90. Each of the location signals, 46, 52, 54, 56, 58, 60, 62, and/or 64, may represent the conditions existing at the instance that an oblique image and/or nadir image is acquired and/or captured by the oblique image capturing devices 18a and/or 18b, and/or the vertical image-capturing device 20.

In some embodiments, the image capturing computer system 36 may issue an image capturing signal to the oblique image-capturing devices 18a and/or 18b, and/or the vertical image-capturing device 20 to thereby cause those devices to acquire and/or capture an oblique image and/or a nadir image at a predetermined location and/or at a predetermined interval. In some embodiments, the image capturing computer system 36 may issue the image capturing signal dependent on at least in part on the velocity of the platform 12. Additionally, the image capturing computer system 36 may issue a point collection signal to the LIDAR scanner 22 to thereby cause the LIDAR scanner to collect points at a predetermined location and/or at a predetermined interval.

Program logic 94 of the image capturing computer system 36 may decode, as necessary, and/or store the aforementioned signals within the memory 90, and/or associate the data signals with the corresponding image data signals 40a, 40b and/or 42, or the corresponding LIDAR scanner signals 46. Thus, for example, the altitude, orientation, roll, pitch, yaw, and the location of each oblique image capturing device 18a and 18b, and/or vertical image-capturing device 20 relative to the surface 16 and/or object of interest for images captured may be known. More particularly, the [X, Y, Z] location (e.g., latitude, longitude, and altitude) of an object or location seen within the images or location seen in each image may be determined. Similarly, the altitude, orientation, roll, pitch, yaw, and the location of the LIDAR scanner 22 relative to the surface 16 and/or object of interest for collection of data points may be known. More particularly, the [X, Y, Z] location (e.g., latitude, longitude, and altitude) of a targeted object or location may be determined.

The platform 12 may be piloted and/or guided through an image capturing path that may pass over a particular area of the surface 16. In some embodiments, the image capturing path may follow one or more utility lines. The number of times the platform 12 and/or oblique image capturing devices 18a and 18b and/or vertical image-capturing device 20 pass over the area of interest may be dependent at least in part upon the size of the area and the amount of detail desired in the captured images.

As the platform 12 passes over an area of interest, a number of oblique images and/or nadir images may be captured by the oblique image-capturing devices 18a and 18b and/or the vertical image-capturing device 20. In some embodiments, the images may be captured and/or acquired by the oblique image-capturing devices 18a and 18b, and/or the vertical image-capturing device 20 at predetermined image capture intervals that may be dependent, at least in part, upon the velocity of the platform 12. For example, the safe flying height for a fixed wing aircraft may be a minimum clearance of 2,000' above the surface 16, and may have a general forward flying speed of 120 knots. In this example, the oblique image-capturing devices 18a and 18b may capture 1 cm to 2 cm ground sample distance imagery, and the vertical image-capturing device 20 may be capable of capturing 2 cm to 4 cm ground sample distance imagery.

The image data signals 40a, 40b and 42 corresponding to each image acquired may be received by and/or stored within the one or more memories 90 of the image capturing computer system 36 via the I/O port 76. Similarly, the location signals, 52, 54, 56, 58, 60, 62, and/or 64 corresponding to each captured image may be received and stored within the one or more memories 90 of the image-capturing computer system 36 via the I/O port 76. The LIDAR scanner signals 46 may be received and stored as LIDAR 3D point clouds.

Thus, the location of the oblique image capturing devices 18a and 18b, and/or the location of the vertical image-capturing device 20 relative to the surface 16 at the precise moment each image is captured is recorded within the one or more memories 90 and associated with the corresponding captured oblique and/or nadir image.

The processor 70 may create and/or store in the one or more memories 90, one or more output image and data files. For example, the processor 70 may convert image data signals 40a, 40b and/or 42, location signals, 52, 54, 56, 58, 60, 62, and/or 64, and the LIDAR scanner signals 46 into computer-readable output image, data files, and LIDAR 3D point cloud files. The output image, data files, and LIDAR 3D point cloud files may include a plurality of captured image files corresponding to captured oblique and/or nadir images, positional data, and/or LIDAR 3D point clouds corresponding thereto.

Output image, data files, and LIDAR 3D point cloud files may then be further provided, displayed and/or used for obtaining measurements of and between objects depicted within the captured images, including measurements of the heights of such objects. In some embodiments, the image capturing computer system 36 may be used to provide, display and/or obtain measurements of and between objects depicted within the captured images. Alternatively, the image capturing computer system 36 may deliver the output image, data files, and/or LIDAR 3D point clouds to one or more processors, such as, for example, the processors 82 illustrated in FIG. 4 for processors 82 to provide, display and/or obtain measurement.

In some embodiments, delivery of the output image, data files, and/or LIDAR 3D point cloud files may also be by physical removal of the files from the image capturing computer system 36. For example, the output image, data files, and/or LIDAR 3D point cloud files may be stored on a removable storage device and transported to one or more processors 82. In some embodiments, the image capturing computer system 36 may provide at least a portion of the display and/or determine at least a portion of the measurements further described herein.

For simplicity, the following description for measurement of objects of interest as described herein includes reference to utility wires, utility poles, and utility towers, however, it should be understood by one skilled in the art that the methods described herein may be applied to any structure of interest. For example, the methods may be applied to a building structure, such as a roof, wherein the roof is the object of interest.

Figure 5:
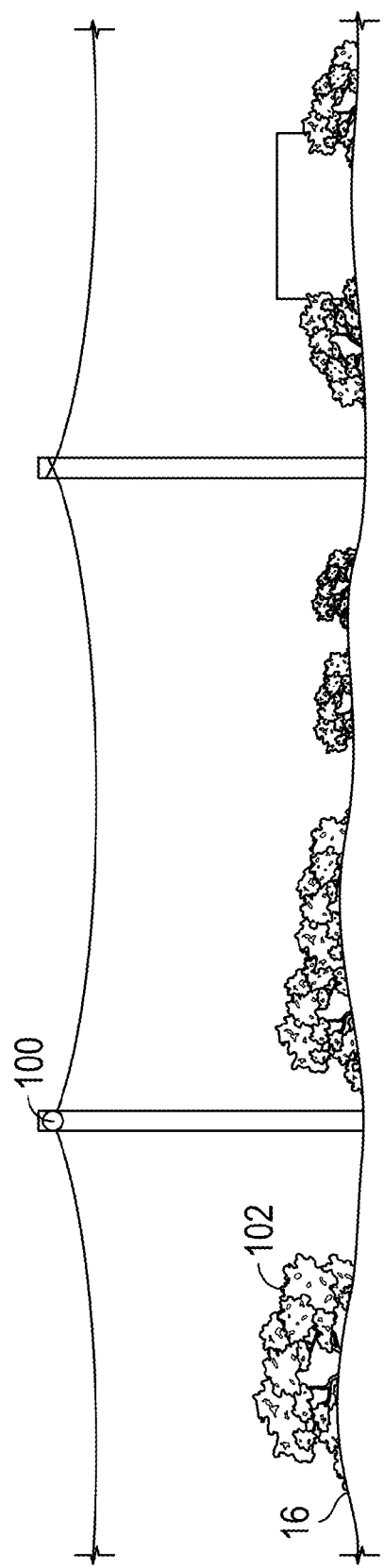
FIG. 5 is an exemplary LIDAR 3D point cloud depiction illustrating classification of structures therein.
Figure 6:
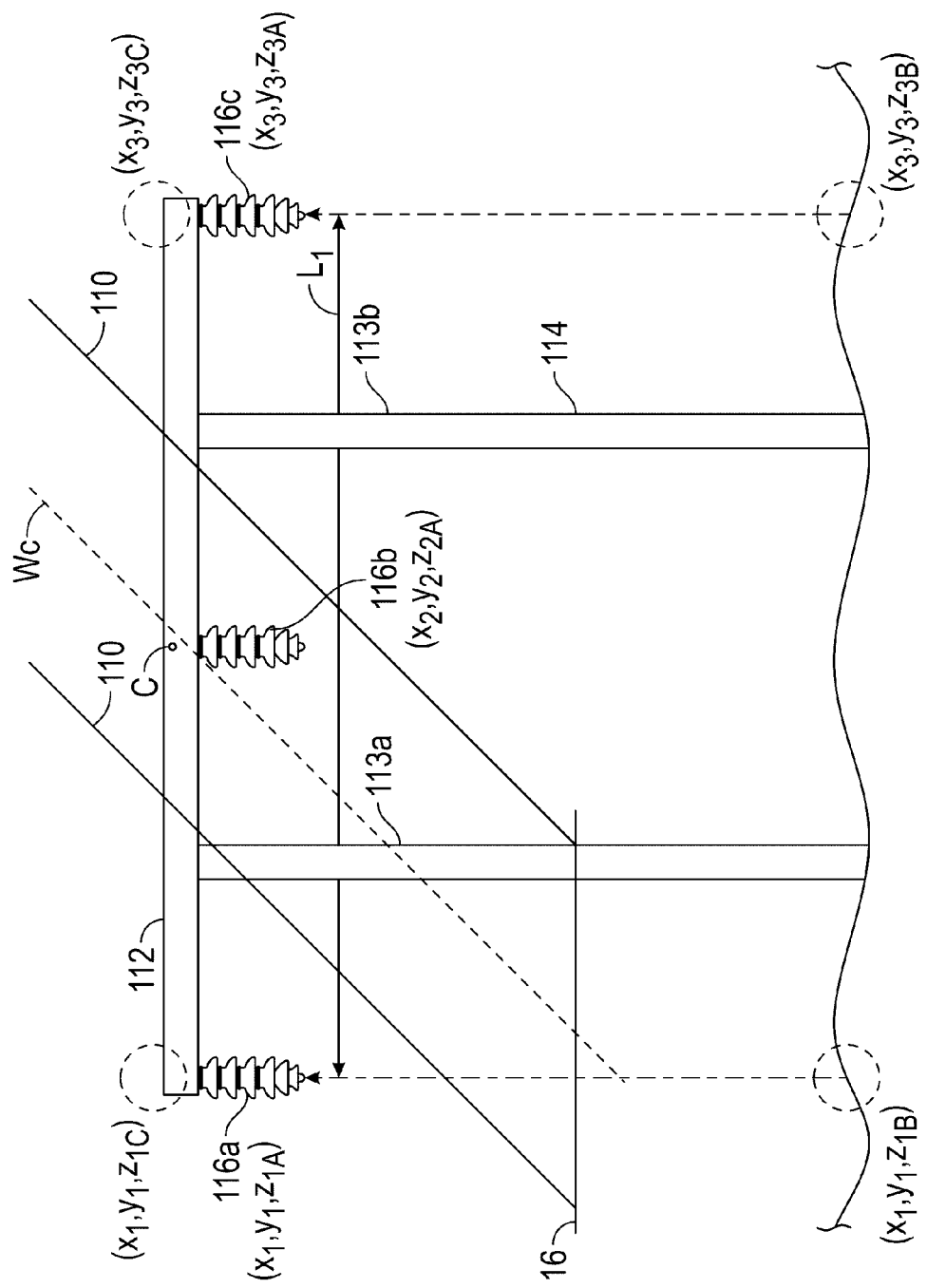
FIG. 6 is an exemplary diagram illustrating an exemplary utility tower having utility wires, a cross bar, and insulators.

Referring to FIGS. 5 and 6, the output image file and data files may be used to geo-reference the oblique and/or nadir images. Exemplary methods for georeferencing the imagery may be found in at least U.S. Pat. Nos. 7,424,133 and 5,247,356, which are hereby incorporated by reference in their entirety.

The LIDAR 3D point cloud files may be processed and geo-referenced. For example, the LIDAR 3D point cloud files may be processed and geo-referenced using software such as Reigl's RiProcess application, distributed by Reigl located in Horn, Austria. Generally, processing of the LIDAR 3D point cloud files may include classifying points in the data into at least three categories: objects of interest 100 (e.g., towers 114, utility wires 110), background structures 102 (e.g., background vegetation, background structures), and surface points 16 (e.g., ground points). For example, the LIDAR post processing software may classify points as being the surface 16, e.g., ground, utility wires 110, towers 114, and/or foliage or other background items. The towers 114 can be utility towers configured to support the utility wires 110. The towers 114 can be implemented in a variety of forms, such as H-style utility towers, utility poles, steel truss style utility towers, concrete utility towers and combinations thereof. In some embodiments, the classifications listed above may be further subdivided as needed.

Referring to FIGS. 4, 5, and 6, in some embodiments, the images and/or 3D point cloud files can be scanned for horizontal objects of interest to locate utility wires 110, for example. Scanning for horizontal objects of interest, such as the utility wires 110, may be aided by the use of a geographical information system (GIS) data system 120 illustrated in FIG. 4. For example, the GIS data system 120 may include data from a utility company. GIS data may include, but is not limited to, right of way centerlines, GIS data for location of towers 114, GIS data for utility wires 110, Computer Aided Design (CAD) data for the utility wires 110, and/or the like.

In some embodiments, the GIS centerline vector data may be used to automatically follow the path of the utility network. The GIS centerline data is typically maintained by the utility companies and may include the geographical position on the Earth of individual towers 114; however, such data may not be updated and/or may be changed. The geographical position can be in any suitable coordinate system, such as Latitude/Longitude. The centerlines, however, may remain largely unchanged as they may typically be tied to a property boundary.

If the GIS data is inaccurate and/or unavailable, utility wires 110 may also be identified using either LIDAR 3D point cloud files and/or the image data without the use of GIS data. For example, utility wires 110 may generally be relatively straight lines and distinctive as compared to other structures within the image. In three-dimensional space, utility lines 110 may be above ground and at a relatively consistent elevation range. As such, standard edge detection algorithms may be used to identify the utility lines 110. Standard edge detection algorithms may include, but are not limited to, a Laplacian filter and/or the like. Additionally, in some embodiments, a Hough Transform and/or similar algorithm, may determine the long straight feature of the utility wires 110.

In some embodiments, a Gabor filter may be used to identify the utility wires 110. The general use of a Gabor filter in identifying utility lines is described in Mu, Chao, et al. "Power lines extraction from aerial images based on Gabor filter." International Symposium on Spatial Analysis, Spatial Temporal Data Modelling, and Data Mining. International Society for Optics and Photonics, 2009, which is hereby incorporated by reference in its entirety. This method may be further modified to identify utility wires 110 and cross bars 112 of the towers 114. Even further, the method may be modified to apply photogrammetry to automatically isolate features in the oblique image(s) as discussed in further detail herein.

For LIDAR 3D point cloud files, intensity values of points may be identified and reviewed to determine the location of the utility wires 110. Generally, parallel lines having periodic perpendicular edges may be identified as utility wires 110. Additional LIDAR data points of the LIDAR 3D point cloud file may be discarded if the LIDAR data points do not correspond to the parallel lines and/or periodic perpendicular edges. For example, single lines having no close parallel line (e.g., within 15' or less, for example) may be discarded. Additional discrimination may be performed if there are no identifiable cross arms 112 in the LIDAR data points of the LIDAR 3D point cloud file. For example, if there are no periodic edges running perpendicular to parallel lines, the points are probably not associated with utility wires 110.

Once utility wires 110 are identified, a wire centerline $W_C$ may be determined to follow the utility corridor. In some embodiments, the wire centerline $W_c$ may be determined using a line fitting algorithm (e.g., RANSAC least squares algorithm). Using the wire centerline $W_C$ as a guide, measurements may be taken at predetermined increments of the utility corridor along the wire centerline $W_C$. In some embodiments, the increments may be less than the height of the smallest tower 114 being searched. At each increment, a search may be performed to identify one or more clusters of LIDAR data points corresponding to one or more towers 114, cross arms 112, and/or utility wires 110.

LIDAR data points for utilities may further be discarded based on elevation. For example, if the LIDAR data point(s) are unclassified (i.e., not classified as an object of interest 100, background structures 102, or surface 16), then the unclassified points within a predetermined distance of the lowest elevation points that are classified may be discarded. These points may be discarded as they may relate to the surface 16 and/or background vegetation. Unclassified points above the lowest elevation points that are classified may be considered to be part of the tower 114. Typically, taller vegetation may be kept below utility lines 110, and as such, vegetation point may not be included in the search. In identifying vegetation in relation to towers 114, the algorithm may also look for an increased number of points at a predetermined radius (e.g., 30' radius) from a search point having unclassified points, since such points will not be related to utility wires 110 if they are vegetation.

Figure 7:
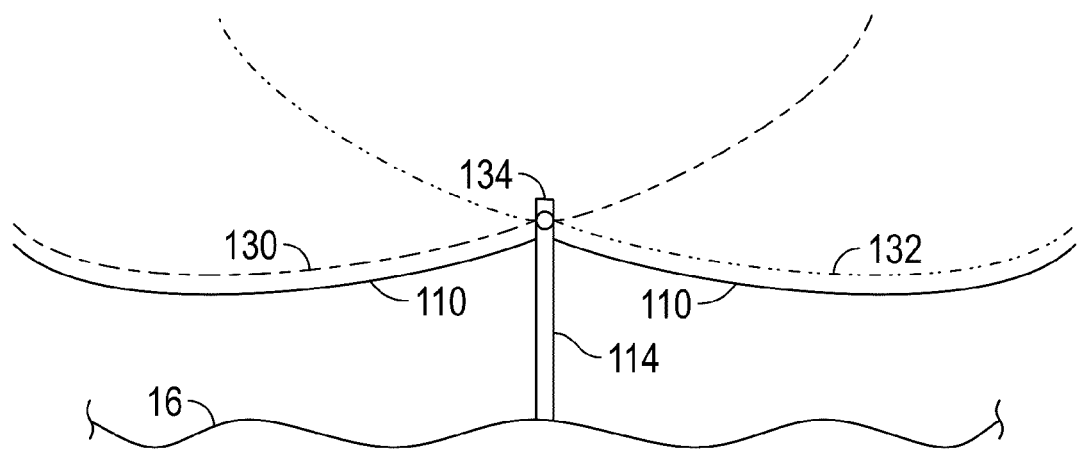
FIG. 7 is another exemplary LIDAR 3D point cloud depiction illustrating parabolas fitted to adjacent utility wires, wherein the location of intersection of the parabolas estimates the location of a utility tower.

In some embodiments, towers 114, may be identified using catenary curves of the utility lines 110. For example, as illustrated in FIG. 7, utility wires 110 generally form parabolic curves 130 and 132 meeting at a distinct attachment point 134. Analyzing the utility wires 110 to find adjacent and intersecting parabolic curves 130 and 132 may determine the distinct attachment point 134 at the location of intersection. The towers 114 location may be found at the distinct attachment point 134.

In some embodiments, once a cluster of LIDAR data points is identified, an algorithm may calculate a center of mass and grow the cluster such that it includes all of points reasonably within the area of interest. For example, a point density algorithm may be used to grow the cluster such that new points may be below a selected density threshold. A Convex Hull algorithm may then be used to isolate the cluster of points and identify a grouping of points, classifying the points as the tower 114.

Referring to FIG. 5, cross arms 112 may be identified within the oblique and/or nadir images. Cross arms 112 may be identified as horizontally extending, beam-like structures located close to or at relatively the same elevation of the utility wires 110. In some embodiments, cross arms 112 may have a major axis extending near perpendicular (e.g., within 10 degrees of perpendicular) to and at relatively the same elevation of the utility wires 110. In some embodiments, the search and/or scanning may be aided by the use of GIS data for the location of the towers 114 and/or from the CAD data of the towers 114.

Figure 8A:
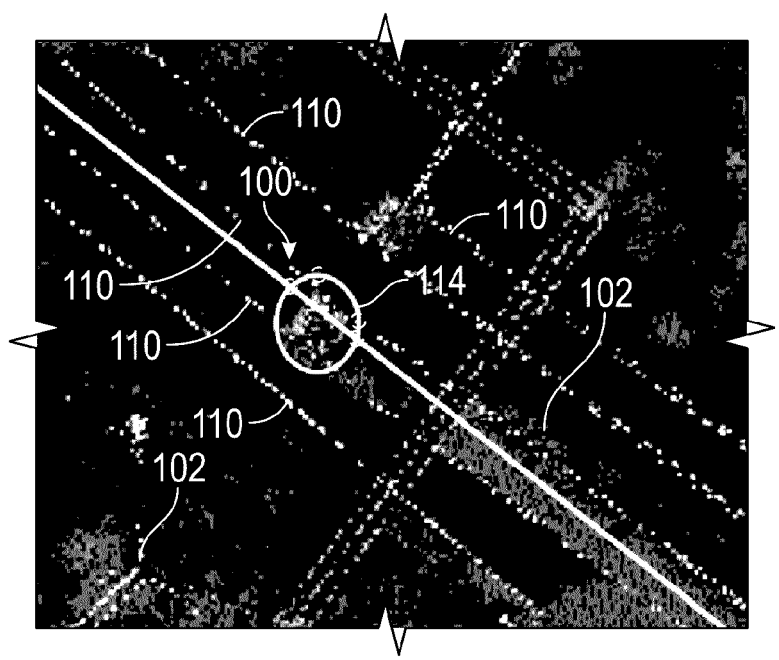
FIG. 8A and FIG. 8B are exemplary LIDAR 3D point clouds illustrating location and identification of clusters as utility wires and/or cross bars within the utility corridor.
Figure 8B:
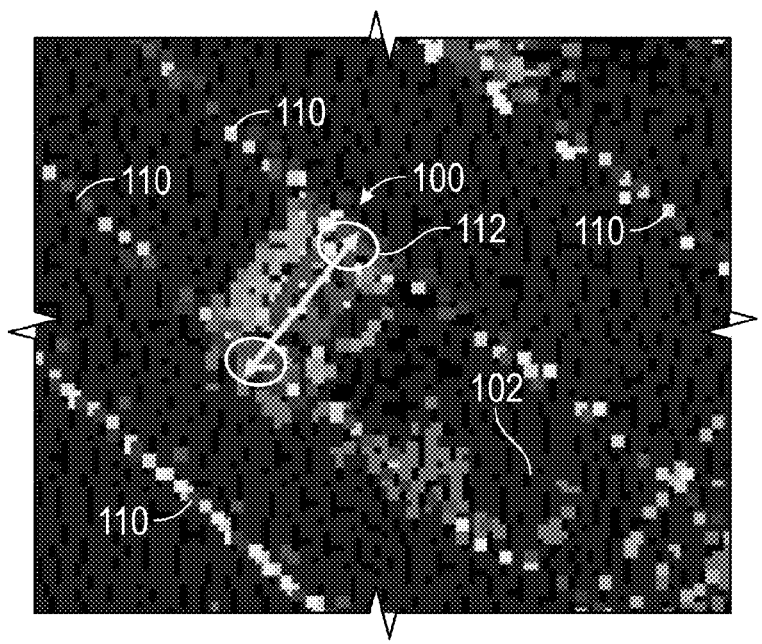

In some embodiments, the output image files and/or the LIDAR 3D point cloud files may be scanned for horizontally extending structures (e.g., having a major axis extending horizontally) indicative of cross arms 112, as discussed above. FIGS. 8A and 8B show a LIDAR 3D point cloud with FIG. 8B as a magnified view of the portion around the object of interest 100. In FIGS. 8A and 8B, the LIDAR 3D point cloud files may classify objects of interest 100 and background vegetation 102. The utility wires 110 may be identified in the LIDAR 3D point cloud file and/or the output image files. As such, the cross arms 112 may be identified as horizontal structures near perpendicular to and/or interesting with the utility wires 110 as illustrated in FIG. 8B. In some embodiments, the industry standard edge detection and line identification algorithms may be used to determine the location of the utility wires 110 using the LIDAR data files.

Utility wires 110 may make a turn in the utility line. At such a turn, the angle of the structure of the cross arm 112 may not be perpendicular, but may typically be either perpendicular to a single utility wire 110 or the other wire, bisecting the angle formed by the two utility wires, or somewhere in between the perpendiculars and the angle bisector.

Once the cross arms 112 are identified within the LIDAR 3D point cloud files and/or the output image files, the vertical structures beneath the cross arms 112 may be identified. Vertical structures may include towers 114, and/or insulators 116. The vertical structures may be identified using LIDAR data points and/or algorithms capable of isolating points corresponding to the vertical structures.

Prior to or after the horizontal and the vertical structures have been identified in the image files, the images files can be processed to create a pre-calculated tessellated ground plane for each of the images files. The tessellated ground plane can be implemented as a data file or data table having elevation values that are correlated to specific geographical locations on the surface 16 of the Earth. The tessellated ground plane includes a plurality of individual facets having respective elevations. Adjacent pairs of facets share at least two vertices. Each facet has a respective pitch and slope. Tessellated ground plane can be created based upon various data and resources, such as, for example, topographical maps, and/or digital raster graphics, survey data, and various other sources. Techniques for making and using an exemplary tessellated ground plane is described in U.S. Pat. No. 7,424,133, which is hereby incorporated herein by reference.

Figure 9:
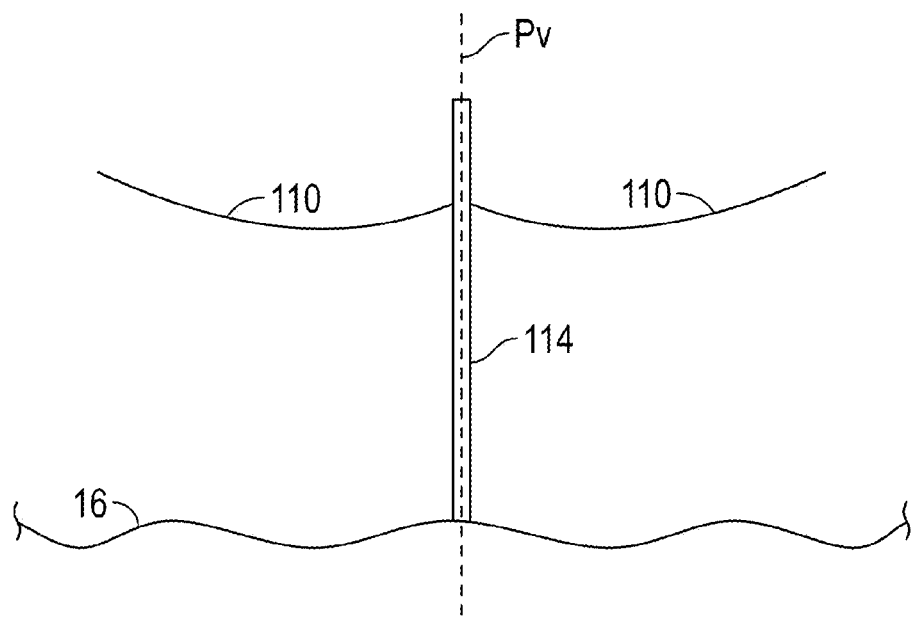
FIG. 9 is a side view of the utility tower illustrated in FIG. 6 having a TGP vertical plane provided therethrough.

Referring to FIGS. 6 and 9, the tessellated ground plane can be supplemented with further information and/or data points indicative of TGP Vertical planes Pv representative of a mathematical model of and to permit measurements to be made on an object of interest, such as a vertical structure. For example, a TGP vertical plane $P_V$ may be placed transversely through the tower 114 and may be relatively parallel to the orientation of the cross arms 112. Generally, the TGP vertical plane $P_V$ of each tower 114 may be formed by identifying points of the tower 114 positioned at a distance farthest from the wire centerline $W_C$ in the (x, y) direction and generally perpendicular to the utility wires 110. The TGP vertical plane $P_v$ may be formed of TGP vertical plane data of real-world three-dimensional location values representative of at least two points on the object of interest depicted in the oblique image and positioned at a distance farthest from a centerline of the object of interest. These points may correspond to the ends 116a and 116b of the cross arms 112. For example, in FIGS. 6 and 8, points $(X_1, Y_1, Z_{1A})$ and $(X_3, Y_3, Z_{3A})$ are positioned at the farthest extent of the tower 114 away from the centerline of the utility wires 110 $(X_2, Y_2, Z_{2A})$. Connecting corresponding points at roughly the same vertical elevation may produce a three-dimensional line roughly corresponding to a center C of the cross arm 112. Optionally, a line fitting algorithm may be used to manipulate the line $L_1$ such that the line $L_1$ is as close to parallel to the cross arm 112 data points and the "center of mass" of the tower 114. The TGP vertical plane Pv may be formed such that it terminates the height of the cross arms 112, or anywhere on the pole and/or tower 114. For example, the TGP vertical plane Pv may be formed such that it extends to the very top height of the pole and/or tower 114. In this example, any and all features on the pole and/or tower 114 may be identified and/or measured using the single ray projection method once the TGP vertical plane Pv is incorporated into the standard ground plane.

Using these points $(X_1, Y_1, Z_{1A})$ and $(X_3, Y_3, Z_{3A})$ positioned at the farthest extent of the tower 114, a line $L_1$ may be fitted therebetween. The line $L_1$ may generally be through the "center of mass" of the structure points of the tower 114. The line $L_1$ may be extended in a z-direction to the top of the tower 114, and may also be extended in a z-direction down to the surface 16 to form the TGP vertical plane $P_V$. The TGP vertical plane data may include at least one real-world three-dimensional location value representative of a three-dimensional location where the object of interest over lies the Earth and having an elevation value indicative of an elevation of the terrain underneath the object of interest. For example, in FIG. 6, the line $L_1$ may be extended upwards in the z-direction to include points $(X_1, Y_1, Z_{1C})$ and $(X_1, Y_1, Z_{3C})$. The line $L_1$ may also be extended downwards in the z-direction to the surface 16 to include points $(X_1, Y_1, Z_{1B})$ and $(X_3, Y_3, Z_{3B})$. Modification of the line $L_1$ with Z values greater than or lower than $Z_{1A}$ and $Z_{3A}$ may form an outer boundary of the TGP vertical plane $P_V$.

Generally, a vast majority of structures on the tower 114 may lie on the TGP vertical plane $P_V$. As such, the TGP vertical plane $P_V$ may be used as a facet within the tessellated ground plane (TGP) for single ray projection measurement methods as described in U.S. Pat. No. 7,424,133, which is hereby incorporated by reference in its entirety. In this instance, the one or more processors 82 may receive one or more signal indicative of a selection and pixel location within a displayed image of a first point and a second point on the tower 114 depicted within the displayed oblique image. The one or more processors 82 may then retrieve from a data file, location data indicative of a position and orientation of an image capturing device (e.g., the oblique image capturing devices 18a and 18b) used to capture the displayed oblique image, and a TGP vertical plane approximating a center of mass of the tower 114. The one or more processors 82 may then determining real-world locations of the first point and the second point utilizing the pixel location of the one or more selected points within the oblique image, the location data and the TGP vertical plane data using the single ray projection measurement methods.

Figure 10:
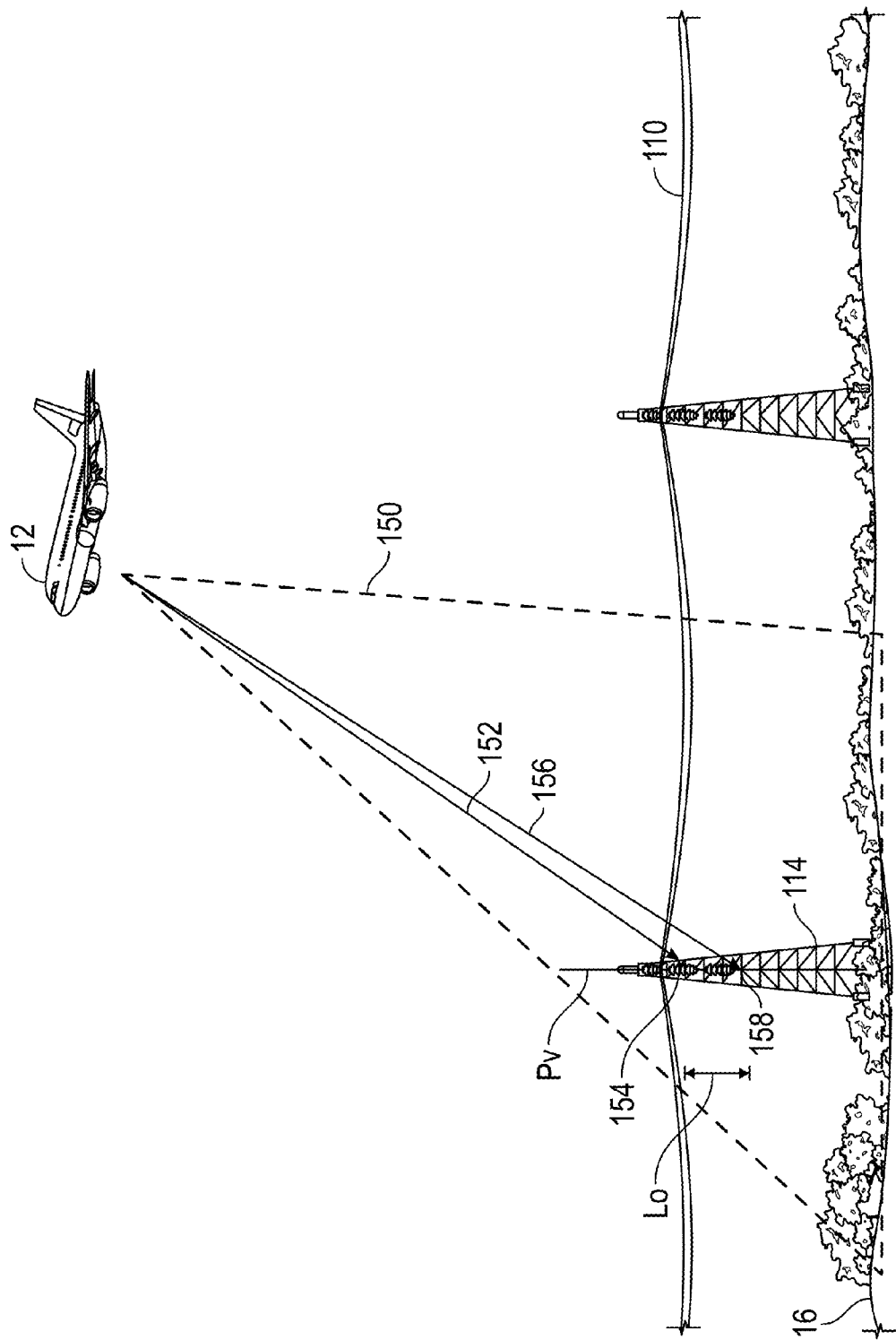
FIG. 10 is an exemplary diagrammatic view illustrating multiple rays projected from a platform to objects of interest on a utility tower based on the view of an oblique image, the rays intersecting the TGP vertical plane of the utility tower.
Figure 11A:
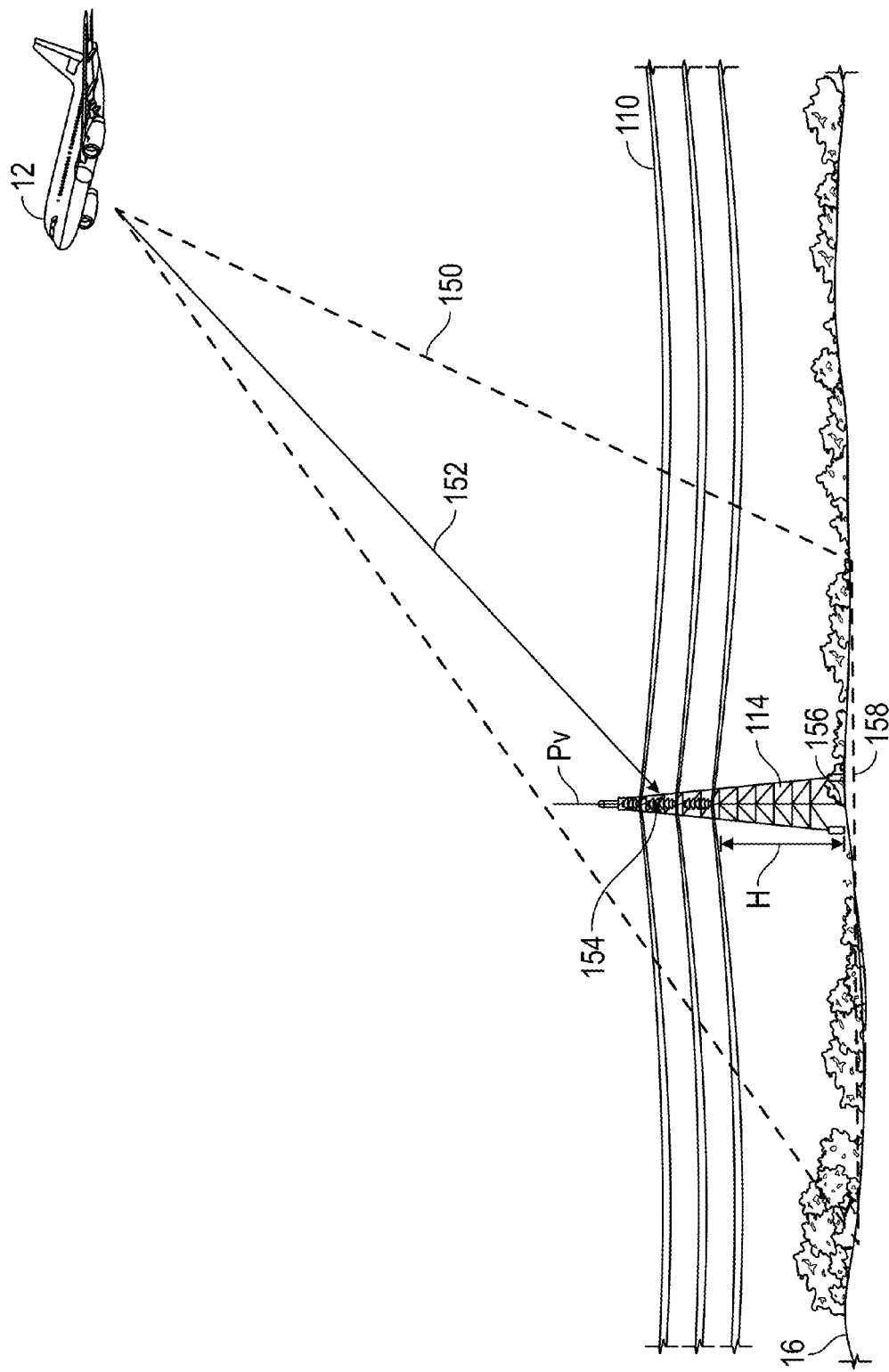
FIG. 11A is another exemplary diagrammatic view illustrating a single ray projected from a platform to an object of interest on a utility pole based on the view of an oblique image, the ray intersecting the TGP vertical plane of the utility tower.
Figure 11B:
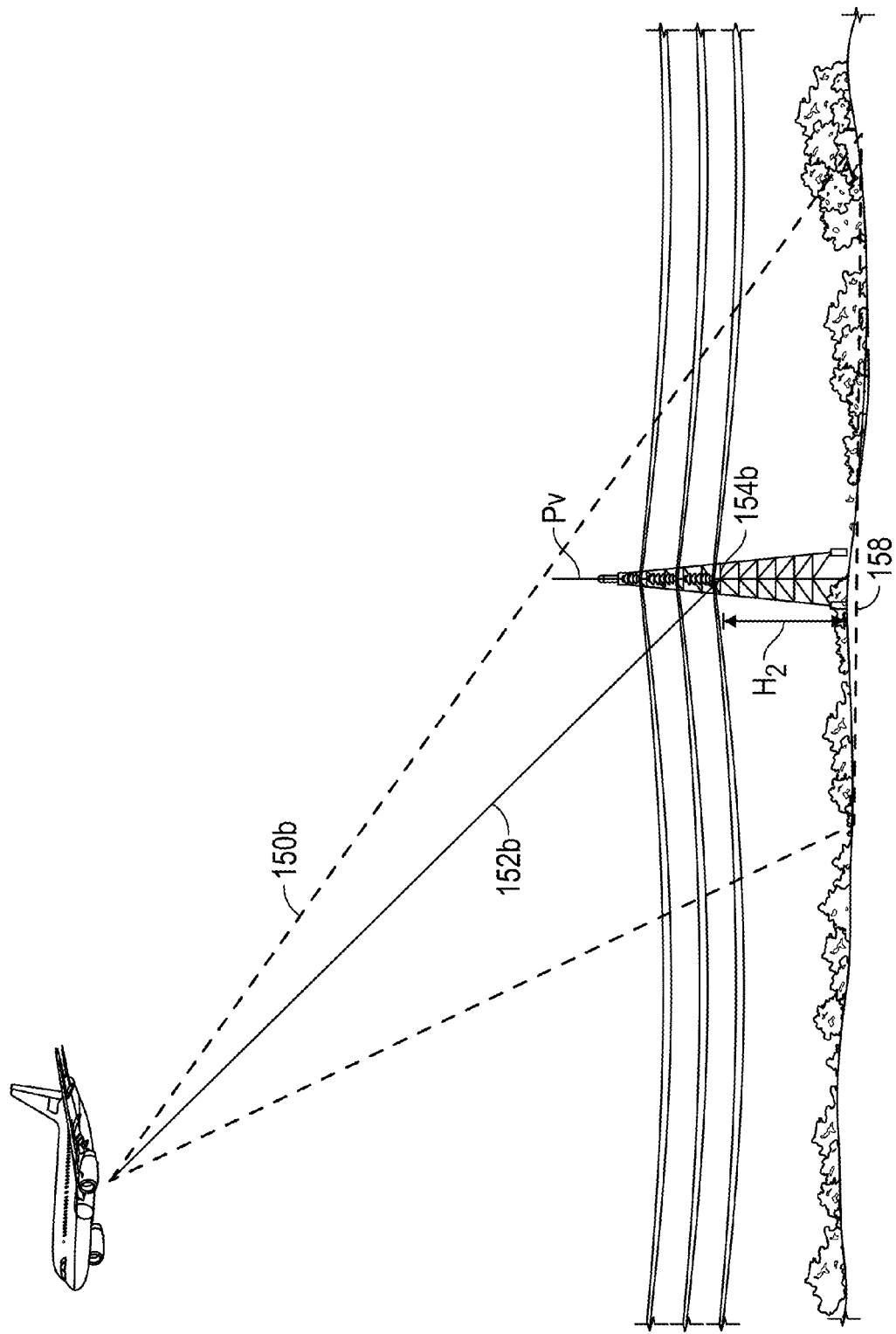
FIG. 11B is a diagrammatic view illustrating boundaries of the opposing view of the oblique image illustrated in FIG. 11A.

Referring to FIGS. 10, 11A and 11B, in order to compensate, at least in part, for changes in elevation and resultant inaccuracies in the measurement of and between objects of interest within an image, location of points within the oblique and/or nadir image may be determined using the TGP vertical plane $P_V$ for reference as a facet within the tessellated ground plane.

Element 150 illustrates the boundaries of a view of a metric oblique image. The oblique image view 150 includes a view of the tower 114 seen within the LIDAR data points. The TGP vertical plane $P_V$ is shown extending through the tower 114. Generally, the geo-location of a point of interest within the oblique image view 150 may be calculated by determining the point of intersection of a ray 152 projected from the platform 12 towards the surface 16. For example, in some embodiments, a user may select a point in the image 150 corresponding to an object on the tower 114. The ray 152 may be projected to intersect the TGP vertical plane $P_V$ prior to the ray 152 intersecting the surface 16. For example, the ray 152 interests the vertical plane $P_V$ in FIG. 10 at intersection point 154. Thus, the location for the point of intersection 154 may be determined on the tower 114 rather than a point on the surface 16 or other tessellated ground plane.

Referring to FIG. 10, the TGP vertical plane $P_V$ may also be used to determine a length $L_O$ of an object on the tower 114. When a first point of the object of interest on the tower 114 is selected, the row and column (e.g., (X, Y) location) of that pixel in the image 150 may be used to calculate projection of the ray 152 towards the surface 16. The algorithm may then identify where the intersection point 154 of the ray 152 occurs on the TGP vertical plane $P_V$ and report the intersection point 154 location on the TGP vertical plane $P_V$. The three-dimensional location of the intersection point 154 can be determined using bilinear interpolation using the coordinates $(X_1,Y_1,Z_{1A})$, $(X_1,Y_1,Z_{1B})$, $(X_3,Y_3,Z_{3A})$, $(X_3,Y_3,Z_{3B})$. If a pixel corresponding to a second point of the object of interest on the tower 114 is selected within the image 150, the algorithm may again be used to produce a second ray 156 and identify the intersection point 158 of the vertical plane $P_V$. The distance between the first intersection point 154 and the second intersection point 158 may be determined (e.g., using Pythagorean Theorem), resulting in the length $L_O$ of the object measured in the image 150.

Generally, in using the TGP vertical plane $P_V$, if an object of interest is located 5' off of the TGP vertical plane $P_V$ when the oblique image view 150 is captured at 2,000' over ground at a roughly 45 degree angle, an object 50' up on the tower 114 may be over 2,750' away. Thus, being 5' away from the TGP vertical plane $P_V$ may only result in a measurement scaling error of less than 0.2% of the actual measurement. By contrast in using a facet conforming to a portion of the surface 16, 50' below the object (i.e., surface 16), there may be a contribution of 14× the amount of error due to relative path length (i.e., 50' down and 50' over, due to a 45 degree view angle). As such, the corresponding point on the ground may be 70' away (i.e., 14× the 5' distance). Additionally, the ground plane (i.e., surface 16) may not be parallel to the object being measured.

Referring to FIGS. 6 and 11A, the TGP vertical plane $P_V$ may also be used to determine a height H above ground of an object of interest. For example, the TGP vertical plane $P_V$ may be used to determine the height H above ground of connection points of the utility wires 110 to the tower 114. A user (e.g., human, processor) may select one or more pixels within the image 150 depicting the insulator 116a, 116b, and/or 116c. The insulators 116a-116c are generally the mechanism used to connect the utility wires 110 to the tower 114. An algorithm may use a pixel location (e.g., x, y) within the image 150 that is indicative of the user selected point to project the ray 152 through the focal plane and down towards the surface 16. Using the ray, the location of the intersection point 154 located on the insulators 116a, 116b, and/or 116c, may be determined on the TGP vertical plane $P_V$. The second point of intersection may be selected on the surface 16 providing the point of intersection on a facet within the tessellated ground plane 158. The Z distance between the two points 154 and 158 in space may be determined to be the height H above ground for the connection point.

It should be noted that the tessellated ground plane 158 having facets conforming to the contours of the surface 16 of the Earth, as described in U.S. Pat. No. 7,424,133, may also be determined using data points collected by the LIDAR scanner 22. Using the normal tessellated ground plane 158, the intersection of the ground may be determined as the intersection of the TGP vertical plane $P_V$ with the tessellated ground plane 158. Using the tessellated ground plane 158, the measurement of the height H may be increased in accuracy in some embodiments, and also may be used for purposes of thermal line ratings.

Referring to FIGS. 6, 11A and 11B, to further increase accuracy, a user may select the same or similar connection point on the tower 114 in two or more oblique image views 150 and 150b. For example, the user may select the insulator 116a on the tower 114 in a forward facing oblique image 150 as illustrated in FIG. 11A and a rear facing oblique image 150b as illustrated in FIG. 11B. In each oblique image view 150 and 150b, the heights H and $H_2$ respectively of the insulator 116a may be determined as described herein. The intersection points 154, 154b and 156, 156b may be found using standard stereo pair photogrammetry techniques such that the location of each point may be determined with increased accuracy as compared to using a single image. The tessellated ground plane 158 may also be used to determine the heights H and $H_2$ increasing accuracy of the determination even further. The tessellated ground plane 158 may further increase accuracy due to the error balancing nature of stereo-photogrammetry, however, single ray projection measurements may also be used to review the measurements for proper selection.

In some embodiments, the stereo analysis using standard stereo pair photogrammetry techniques may be automated or substantially automated. Generally, a corner detection algorithm may be used to find points of interest in two separate oblique image views 150 and 150b for an object. A correlation for the two points of interest may be determined to identify common points between the two points of interest. The strongest correlation may generally be on the desired object.

Using this example, by selecting a pixel indicative of a connection point (e.g., insulator 116a) in a first oblique image view 150, the ray 152 may be determined. The resulting intersection point 154 may be used to select a second oblique image view 150b from an opposing direction. The TGP vertical plane $P_V$ may then be used to find an end of the insulator 116a. A standard corner detection algorithm and/or a correlation algorithm may then be used to find a pixel indicative of the end of the insulator 116a in the second image 150b. Once the end of the insulators 116a in the second image 150b is located, the location of the pixel within the second image 150b, the TGP vertical plane $P_V$, and the camera position and orientation of the second image 150b may be used to cast a second ray 152b through the end of the insulator 116a in the second image 150b. The resulting two rays 152 and 152b may then be used in industry standard stereo photogrammetry to locate the intersection points 154, 154b and 156, 156b. The resulting identification and measurement of and between the points 154, 154b and 156, 156b may be further incorporated into CAD modeling, thermal line ratings, engineering plans, and/or any other use for three-dimensional point determinations. Even further, identification and/or measurement between multiple points between multiple images may aid in formation of Method 1 structure models as known in the industry.

Referring to FIGS. 12-17, identification of matching points between two opposing oblique images 150a and 150b may also be identified using a Gabor filter. The orientation and spatial frequency of the Gabor filter may be tuned such that the filter acts as an oriented bandpass filter.

Referring to FIGS. 12 and 13A, in a nadir image 200, the utility wires 110 include distinct oriented spatial frequencies that may be identified using a Gabor filter providing a Gabor filters image 13A. The orientation of the utility wires 110 in the nadir image 200 may be identified based on the orientation of the platform 12 (illustrated in FIG. 1) during flight. Additionally, identification of the spacing between each utility wire 110 may aid in tuning the Gabor filter to produce maximum response, however, a reasonable estimation of the frequency may be used.

Referring to FIGS. 13A and 13B, a maximum value threshold may isolate the highest response from the Gabor filtered image 210 creating a threshold image 220. Once the threshold image 220 is created, linear features may be identified within the threshold image 220 producing detected utility wires 222. For example, detected utility wires 222 may be identified within the threshold image 220 using the Hough Transform, filtering for lines that may only be at two specified orientations of the Gabor filter.

Referring to FIGS. 12, 14A and 14B, in some embodiments, the cross arm 112 connecting the utility wires 110 may be extracted using a Gabor filter. For example, the cross arm 112 may be extracted by rotating the orientation of the Gabor filter within a range from 85-95 degrees (preferably 90 degrees) producing a Gabor filter image 230 in FIG. 14A having Gabor detected features 232. A maximum value threshold may isolate the highest response from the Gabor filtered image 230 creating a threshold image 240. Once the threshold image 240 is created, linear features may be identified within the image similar to threshold image 220 producing detected cross bar lines 232.

Since many lines within the threshold image 240 may not be continuous, the entire cross bar 112 of FIG. 12 may not be detected. As such, each detected utility wire 222 of threshold image 220 (illustrated in FIG. 13B) may be intersected with the detected cross bar lines 242 of threshold image 240 (illustrated in FIG. 14B) to define endpoints 250 and 252 of the cross arm 112 between the utility wires 110 as illustrated in FIG. 15A. An extension 254 may be applied to the detected cross bar 242 based on the defined maximum and minimum endpoints 250 and 252 as illustrated in FIG. 15B.

Figure 16:
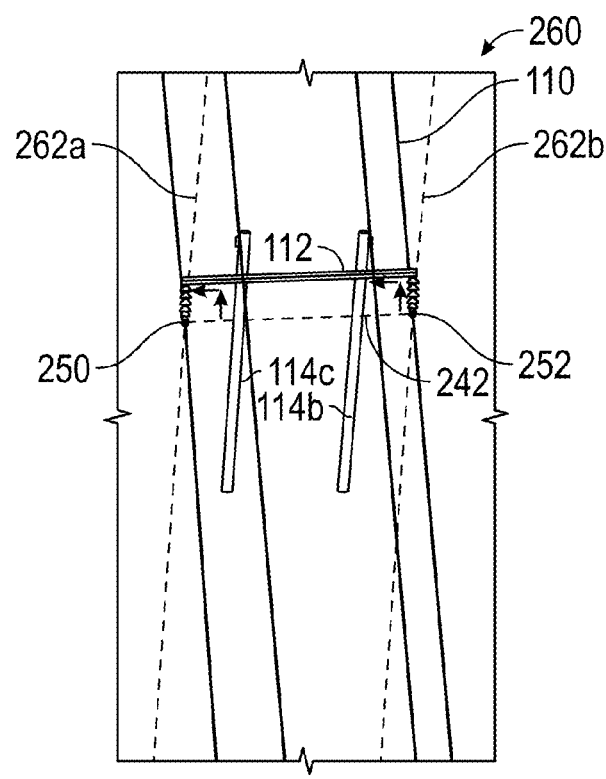
FIG. 16 is an exemplary oblique image having the detected cross bar of FIG. 14B positioned therein.

Referring to FIG. 16, a correlation of endpoints 250 and 252 for the detected cross bar 242 may be initiated using an oblique image 260 of the object identified in the nadir image of FIG. 12. The correlation region in the oblique image 260 may be produced by projecting the endpoints 250 and 252 of the detected cross bar 242 into the oblique image 260, and correlating a region around epipolar lines 262a and 262b for each endpoint 250 and 252 of the detected cross bar 242. For example, the detected cross bar 242 may be correlated such that the detected cross bar 242 substantially lies on the cross bar 212.

Figure 17:
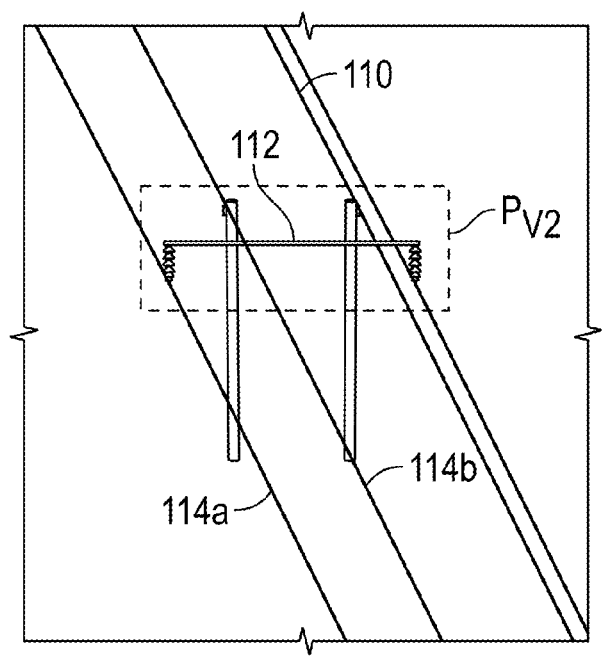
FIG. 17 is another exemplary oblique image having the detected cross bar of FIG. 14B positioned therein, the oblique images of FIG. 16 and FIG. 17 being opposing views.

Additionally, matching points between opposing oblique images having detected cross arms 242 may be identified. Using these points, a region of interest may be determined around each detected cross arm 242. Other features of the tower 114 may then be further identified using the region of interest. In one example, as illustrated in FIG. 17 a second TGP vertical plane $P_{V2}$ may be defined and/or extended from the identified cross arm 112 such that the TGP vertical plane $P_{V2}$ extends a pre-determined distance from the identified cross arm 112 and contains remaining features to be identified using methods as described herein.

Referring to FIGS. 18A-18D, in some embodiments, a template may be used to determine location of objects of interest on structures (e.g., cross bars 112 on tower 114). For example, FIGS. 12A-12D illustrate an exemplary embodiment of a utility template 159 for use in determining location of objects of interest, such as towers 114. Generally, a user may be supplied with one or more template structures. The templates may correlate with identified structures within the oblique images and/or vertical images. For example, the template 159 illustrated in FIGS. 12A-12D is a template of a "H" style tower 114. The user (e.g., human, processor) may align the template 159 to the object of interest.

For example, as illustrated in FIG. 18A, the user may align a first leg section 160a of the "H" with a first leg 113a of the tower 114. The user may then laterally stretch the template 159 such that a second leg section 113b of the "H" of the template 159 may be aligned with a second leg 113b of the tower 114 as illustrated in FIG. 12B. The user may vertically stretch the template 159 such that a cross line 162 of the template 159 may be aligned with the cross arm 112 of the tower 114 as illustrated in FIG. 12C. Finally, the user may adjust one or more lengths of the cross line 162 of the template 159 to substantially lie on the insulators 116a-116c of the tower 114. The template 159, once adjusted, may lie directly on the tower 114. By determining the vertical plane $P_V$, as described herein, the location of the tower 114 in space may be known. The same template 159, as such, may be projected onto one or more images with opposing views of the tower 114. Slight adjustments may be made to compensate for any minor errors in the position and/or orientation measurements (e.g., position and/or orientation measurements due to camera error).

Standard stereo triangulation may also be used to determine location of each end of the line segments within the template 159. With the determination of the location of each end of the line segments within the template 159, the structure and location of the tower 114 within space may be determined and applied to one or more additional oblique and/or nadir images.

Referring to FIGS. 2, 6 and 9, the TGP vertical plane $P_V$ may also aid in generation of additional three-dimensional points to augment the three-dimensional point cloud generated by the LIDAR scanner 22. The LIDAR scanner 22 may not identify a significant number of points on faces of the towers 114, as will be explained below. If, the LIDAR scanner is positioned and aimed towards nadir, upper structures of the tower 114 may obscure elements below the tower 114. In addition, truly vertical structures may not produce a significant return to the LIDAR scanner 22 if the LIDAR scanner 22 is aimed towards nadir. If the LIDAR scanner 22 is tilted forward or backward at an angle to try and produce a greater return, the point density may still be low due to the cosine effect. For example, if the LIDAR scanner 22 is tilted forward by 10 degrees, and the LIDAR scanner collects data at 50 points per square meter such that there is a 6" sampling distance on the surface 16. Because the laser beam of the LIDAR scanner 22 intersects the tower 114 at an angle of 10 degrees, a 100 foot tall pole may only appear to be about 17 feet in length, and as such, may only get approximately 34 points over the height of the tower 114 (as compared to over 200 points produced the same distance on the surface 16). Additionally, the angle of incidence of the imagery may be closer to 45 degrees. The same 6" resolution may produce 140 points on a face of the tower 114. The imagery, however, isn't at the same 6" resolution, it may be at a 2" resolution. This may produce increased resolution in each direction, such that if each pixel yields a correlation point, more than 420 points along the height of the tower 114 may be produced. Even further, the pixel resolution being generally smaller than the diameter of the tower 114, multiple points across the diameter of the tower 114 may be produced.

Figure 19:
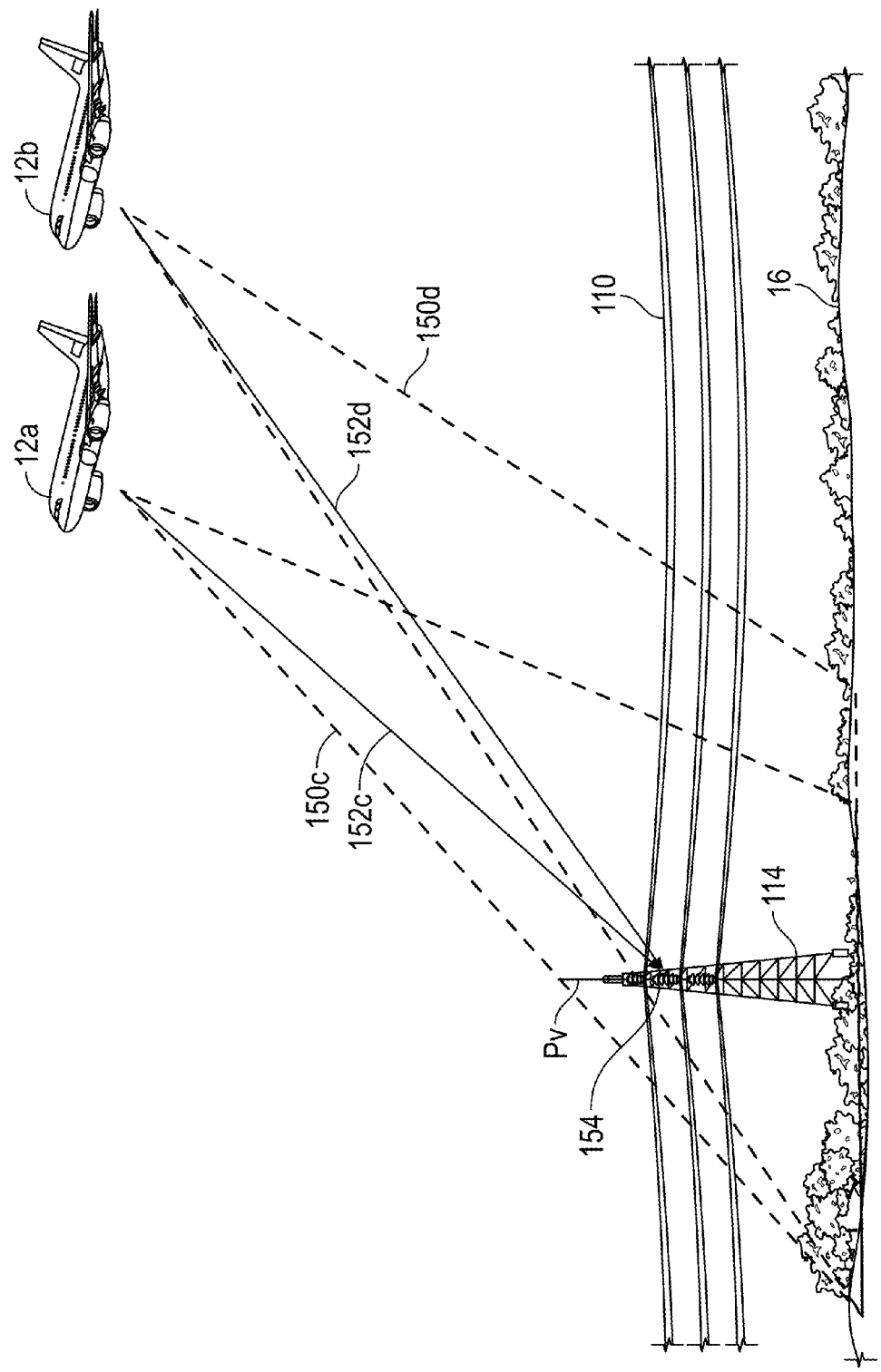
FIG. 19 is a diagrammatic view illustrating boundaries of two successive oblique images for finding additional three-dimensional points on the surface of a utility tower.

Referring to FIGS. 2 and 19, additional three dimensional points to include in the 3D point cloud may also be determined using successive oblique image (e.g., a first oblique image view 150c and a second oblique image view 150d). Both the first oblique image view 150c and the second oblique image view 150d may include an object of interest, such as, for example, the tower 114. The TGP vertical plane $P_V$ may be determined using the methods as described herein. Once identified, the TGP vertical plane $P_V$ may be used to select one or more overlapping oblique images oriented in the same direction (e.g., both forward looking camera orientations or both rearward looking camera orientation). The TGP vertical plane $P_V$ may be used to identify the location of the tower 114 in each image 150c and 150d as described in detail herein using either one or both of rays 152c and 152d. The locations of the tower 114 in each image 150c and 150d may be used in an automated point matching algorithm (e.g., Semi Global Image Mapping algorithm) to find corresponding points between the two images 150c and 150d.

Figure 20:
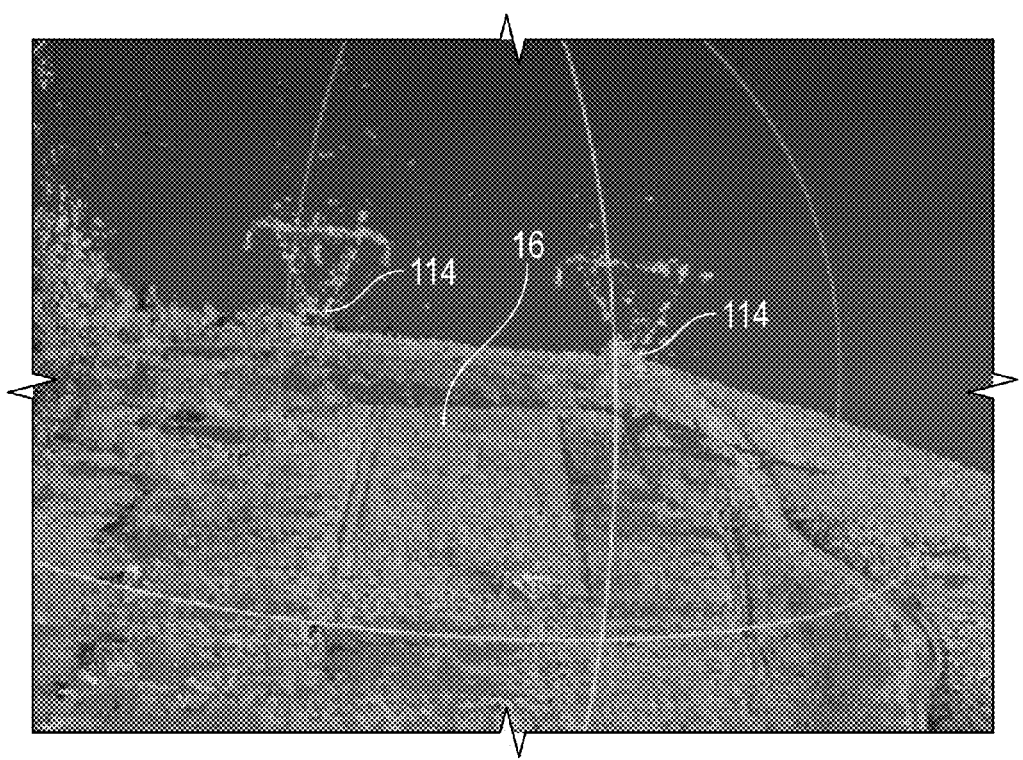
FIG. 20 is a LIDAR 3D point cloud generated from stereo pair oblique images showing ground points and utility tower points.

Either one of the projected rays 152c and 152d may then be used in a single ray-projection algorithm or (both of the rays 152c and 152d in a standard stereo photogrammetry algorithm) to find the real-world, three-dimensional location of the point of intersection that may be added to the point cloud produced by the LIDAR scanner 22. It should be noted that there may be alignment errors (e.g., inertial navigation system (INS) errors), and as such, the point cloud may be misaligned with the results produced by the LIDAR scanner 22. These two point clouds may be related through a similarity transform with uniform scale. The transform (e.g., iterative closest point algorithm) may iteratively estimate the distance between the results produced by the LIDAR scanner 22 and a point cloud produced by the images 150c and 150d. The resulting point cloud from combining results produced by the LIDAR scanner 22 and the point cloud produced by the images 150c and 150d may be denser and include points located on multiple faces of structures. For example, having two oblique image capturing devices 18a and 18b as illustrated in FIG. 1 may produce images on multiple sides of structures as compared to having only a single LIDAR scanner titled in a single direction gathering points on a single side of a structure. FIG. 20 is a three-dimensional point cloud generated from stereo pair oblique images showing points of the ground 16 and points of utility towers 114. As shown, the point cloud produced by the oblique images includes points on the horizontal surfaces (e.g., ground 16) and points on the vertical surfaces (e.g., vertical facet of the utility towers 114).

Although the preceding description has been described herein with reference to particular means, materials and embodiments, it is not intended to be limited to the particulars disclosed herein; rather, it extends to all functionally equivalent structures, methods and uses, such as are within the scope of the appended claims.

What is claimed is:

1. A method for analyzing a utility network comprising:
capturing images of a geographic area encompassing at least a portion of a utility network with one or more image capturing devices, the images including utility wires and utility towers having cross bars as well as location and orientation data for each of the images corresponding to the location and orientation of the one or more image capturing devices capturing the image; and analyzing at least one of the images with a computer system running a utility network detection algorithm with a gabor filter to identify pixel locations within the at least one image of cross bars depicted within the images, wherein the gabor filter is a first gabor filter having a first longitudinal axis, the pixel locations are first pixel locations, and wherein analyzing further comprises analyzing at least one of the images with the computer system running the utility network detection algorithm with a second gabor filter having a second longitudinal axis substantially aligned with the utility wires depicted in the at least one image to identify second pixel locations within the at least one of the images of the utility wires depicted within the at least one of the images, wherein the first longitudinal axis extends within a range between 85 to 95 degrees relative to the second longitudinal axis.

2. The method of claim 1, further comprising the step of converting the first and second pixel locations to real-world three dimensional coordinates using the first and second pixel locations and the location and orientation data corresponding to the location and orientation of the one or more image capturing devices capturing the images and storing the real-world three dimensional coordinates within a three-dimensional model of the utility network.

* * * * *